US010432370B2

(12) United States Patent
Luo et al.

(10) Patent No.: US 10,432,370 B2
(45) Date of Patent: Oct. 1, 2019

(54) TRANSMISSION AND PROCESSING OF HIGHER ORDER MODULATION

(71) Applicant: QUALCOMM Incorporated, San Diego, CA (US)

(72) Inventors: Tao Luo, San Diego, CA (US); Durga Prasad Malladi, San Diego, CA (US); Yongbin Wei, San Diego, CA (US); Wanshi Chen, San Diego, CA (US); Aleksandar Damnjanovic, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 481 days.

(21) Appl. No.: 14/152,820

(22) Filed: Jan. 10, 2014

(65) Prior Publication Data
US 2014/0198749 A1 Jul. 17, 2014

Related U.S. Application Data

(60) Provisional application No. 61/752,210, filed on Jan. 14, 2013.

(51) Int. Cl.
*H04L 5/00* (2006.01)
*H04W 72/04* (2009.01)

(52) U.S. Cl.
CPC .......... *H04L 5/0044* (2013.01); *H04L 5/0048* (2013.01); *H04W 72/042* (2013.01)

(58) Field of Classification Search
CPC ... H04L 5/0044; H04L 5/0048; H04W 72/042
See application file for complete search history.

(56) References Cited

U.S. PATENT DOCUMENTS 7,336,683 B1 * 2/2008 Eidson ............... H04B 7/18595
370/479
8,891,661 B2 * 11/2014 Seier .................... H04L 1/0003
375/269

(Continued)

FOREIGN PATENT DOCUMENTS

CN 100442793 C 12/2008
CN 101110662 B 7/2012

(Continued)

OTHER PUBLICATIONS

International Search Report and Written Opinion—PCT/US2014/011322—ISAEPO—dated Apr. 9, 2014.

(Continued)

*Primary Examiner* — Hashim S Bhatti
*Assistant Examiner* — Abdullahi Ahmed
(74) *Attorney, Agent, or Firm* — Arent Fox, LLP

(57) ABSTRACT

A method, an apparatus, and a computer program product for wireless communication are provided. The apparatus may be a UE. The UE identifies properties associated with reference signals of a received payload. The properties associated with reference signals of the received payload may include a reference signal structure and/or a traffic to pilot ratio. The UE determines a payload structure based on the identified properties. Subsequently, the UE decodes the received payload based on the determined payload structure. The UE may receive mapping information indicating a mapping between possible properties associated with reference signals and possible payload structures. The UE may determine the payload structure further based on the received mapping information. The UE may receive the mapping information through a broadcast or RRC signaling.

31 Claims, 12 Drawing Sheets

(56) References Cited

U.S. PATENT DOCUMENTS

| | | | |
|---|---|---|---|
| 2002/0131486 A1* | 9/2002 | Haartsen | H04L 1/0003 375/229 |
| 2003/0053435 A1 | 3/2003 | Sindhushayana et al. | |
| 2005/0201280 A1* | 9/2005 | Lundby | H04L 1/0002 370/229 |
| 2009/0040919 A1* | 2/2009 | Muharemovic | H04L 5/0044 370/210 |
| 2009/0129259 A1* | 5/2009 | Malladi | H04B 7/0417 370/210 |
| 2010/0023830 A1* | 1/2010 | Wengerter | H04L 1/0025 714/748 |
| 2010/0046412 A1* | 2/2010 | Varadarajan | H04L 5/003 370/312 |
| 2010/0054147 A1* | 3/2010 | Ishii | H04L 1/1671 370/252 |
| 2010/0272032 A1* | 10/2010 | Sayana | H04B 7/024 370/329 |
| 2010/0309775 A1* | 12/2010 | Muharemovic | H04J 13/0062 370/210 |
| 2011/0013581 A1* | 1/2011 | Lee, II | H04L 5/0007 370/329 |
| 2011/0110316 A1* | 5/2011 | Chen | H04L 5/0053 370/329 |
| 2011/0310831 A1* | 12/2011 | Bhattad | H04B 7/0413 370/329 |
| 2012/0207054 A1* | 8/2012 | Okubo | H04L 1/0003 370/252 |
| 2012/0281611 A1* | 11/2012 | Zhang | H04W 52/52 370/312 |
| 2013/0121304 A1 | 5/2013 | Nory et al. | |
| 2013/0343273 A1* | 12/2013 | Barbieri | H04L 1/1822 370/328 |
| 2014/0286276 A1* | 9/2014 | Lunttila | H04B 7/024 370/329 |
| 2015/0045016 A1* | 2/2015 | Xiong | H04W 8/005 455/426.1 |

FOREIGN PATENT DOCUMENTS

| | | | |
|---|---|---|---|
| EP | 1489807 A2 | 12/2004 | |
| EP | 2360977 A1 * | 8/2011 | H04W 52/0229 |
| EP | 2541802 A1 | 1/2013 | |
| WO | 0247280 A2 | 6/2002 | |
| WO | 2010127300 A2 | 11/2010 | |
| WO | 2011017467 A2 | 2/2011 | |
| WO | 2011074914 A2 | 6/2011 | |

OTHER PUBLICATIONS

Huawei: "LTE-A downlink DM-RS pattern design [online]," 3GPP TSG-RAN WG1#57 R1-092217, URL:http://www.3gpp.org/ftp/tsg_ran/WG1_RL1/TSGR1_57/Docs/R1-092217.zip, May 6, 2009, 10 pages.

* cited by examiner

TRANSMISSION AND PROCESSING OF HIGHER ORDER MODULATION

CROSS-REFERENCE TO RELATED APPLICATION(S)

This application claims the benefit of U.S. Provisional Application Ser. No. 61/752,210, entitled "TRANSMISSION AND PROCESSING OF HIGHER ORDER MODULATION" and filed on Jan. 14, 2013, which is expressly incorporated by reference herein in its entirety.

BACKGROUND

Field

The present disclosure relates generally to communication systems, and more particularly, to transmission and processing of higher order modulation. Specifically, the present disclosure relates to signaling a payload structure of a payload to a UE through properties associated with reference signals in the payload.

Background

Wireless communication systems are widely deployed to provide various telecommunication services such as telephony, video, data, messaging, and broadcasts. Typical wireless communication systems may employ multiple-access technologies capable of supporting communication with multiple users by sharing available system resources (e.g., bandwidth, transmit power). Examples of such multiple-access technologies include code division multiple access (CDMA) systems, time division multiple access (TDMA) systems, frequency division multiple access (FDMA) systems, orthogonal frequency division multiple access (OFDMA) systems, single-carrier frequency division multiple access (SC-FDMA) systems, and time division synchronous code division multiple access (TD-SCDMA) systems.

These multiple access technologies have been adopted in various telecommunication standards to provide a common protocol that enables different wireless devices to communicate on a municipal, national, regional, and even global level. An example of an emerging telecommunication standard is Long Term Evolution (LTE). LTE is a set of enhancements to the Universal Mobile Telecommunications System (UMTS) mobile standard promulgated by Third Generation Partnership Project (3GPP). LTE is designed to better support mobile broadband Internet access by improving spectral efficiency, lowering costs, improving services, making use of new spectrum, and better integrating with other open standards using OFDMA on the downlink (DL), SC-FDMA on the uplink (UL), and multiple-input multiple-output (MIMO) antenna technology. However, as the demand for mobile broadband access continues to increase, there exists a need for further improvements in LTE technology. Preferably, these improvements should be applicable to other multi-access technologies and the telecommunication standards that employ these technologies.

SUMMARY

In an aspect of the disclosure, a method, a computer program product, and an apparatus are provided. The apparatus may be a UE. The UE identifies properties associated with reference signals of a received payload. The properties associated with the reference signals of the received payload may include a reference signal structure and/or a traffic to pilot ratio. In addition, the UE determines a payload structure based on the identified properties. Furthermore, the UE decodes the received payload based on the determined payload structure.

DETAILED DESCRIPTION

Figure 1:
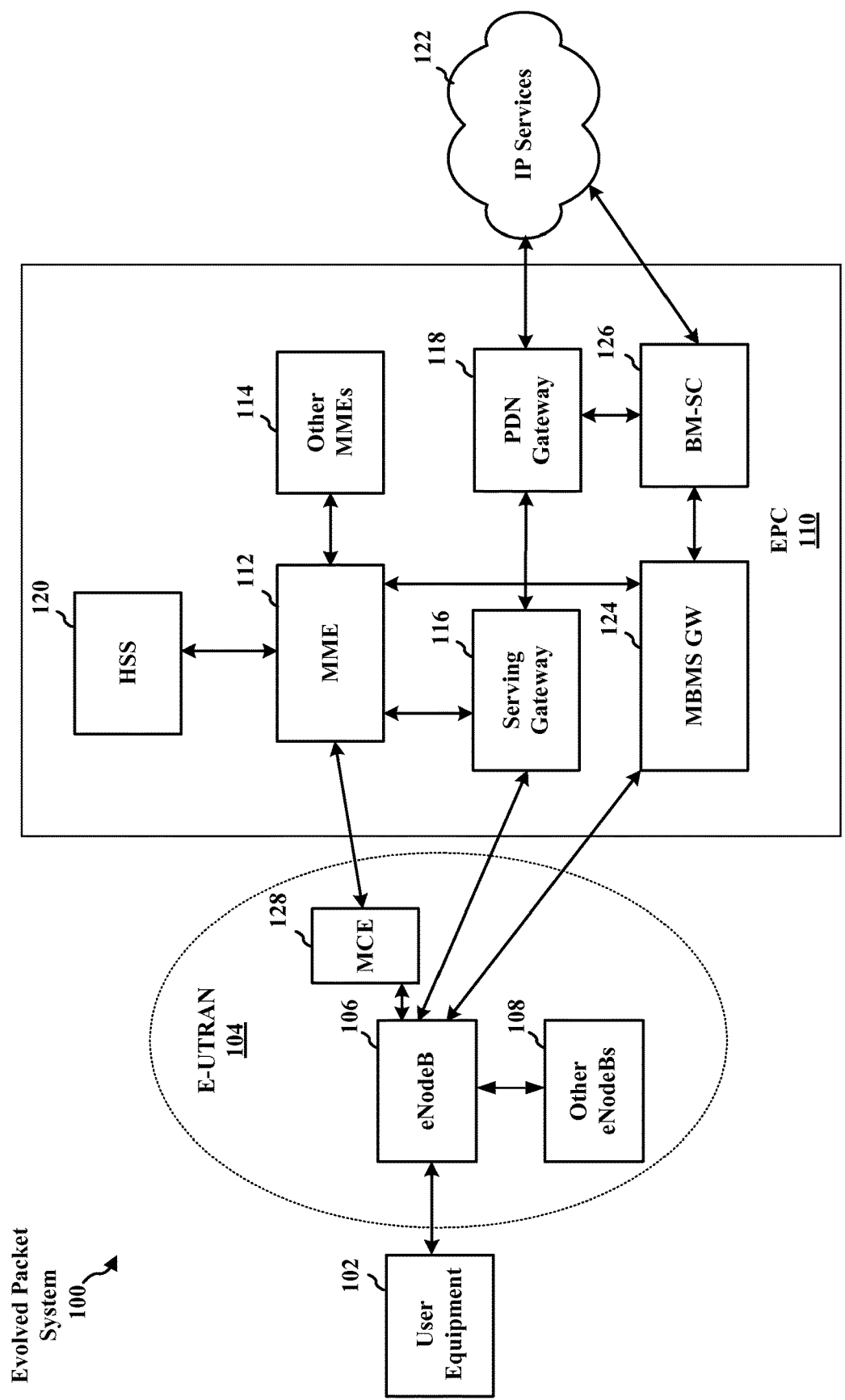
FIG. 1 is a diagram illustrating an example of a network architecture.

The detailed description set forth below in connection with the appended drawings is intended as a description of various configurations and is not intended to represent the only configurations in which the concepts described herein may be practiced. The detailed description includes specific details for the purpose of providing a thorough understanding of various concepts. However, it will be apparent to those skilled in the art that these concepts may be practiced without these specific details. In some instances, well known structures and components are shown in block diagram form in order to avoid obscuring such concepts.

Several aspects of telecommunication systems will now be presented with reference to various apparatus and methods. These apparatus and methods will be described in the following detailed description and illustrated in the accompanying drawings by various blocks, modules, components, circuits, steps, processes, algorithms, etc. (collectively referred to as "elements"). These elements may be implemented using electronic hardware, computer software, or any combination thereof. Whether such elements are implemented as hardware or software depends upon the particular application and design constraints imposed on the overall system.

By way of example, an element, or any portion of an element, or any combination of elements may be implemented with a "processing system" that includes one or more processors. Examples of processors include microprocessors, microcontrollers, digital signal processors (DSPs), field programmable gate arrays (FPGAs), programmable logic devices (PLDs), state machines, gated logic, discrete hardware circuits, and other suitable hardware configured to perform the various functionality described throughout this disclosure. One or more processors in the processing system may execute software. Software shall be construed broadly to mean instructions, instruction sets, code, code segments, program code, programs, subprograms, software modules, applications, software applications, software packages, routines, subroutines, objects, executables, threads of execution, procedures, functions, etc., whether referred to as software, firmware, middleware, microcode, hardware description language, or otherwise.

Accordingly, in one or more exemplary embodiments, the functions described may be implemented in hardware, software, firmware, or any combination thereof. If implemented in software, the functions may be stored on or encoded as one or more instructions or code on a computer-readable medium. Computer-readable media includes computer storage media. Storage media may be any available media that can be accessed by a computer. By way of example, and not limitation, such computer-readable media can comprise a random-access memory (RAM), a read-only memory (ROM), an electrically erasable programmable ROM (EEPROM), compact disk ROM (CD-ROM) or other optical disk storage, magnetic disk storage or other magnetic storage devices, or any other medium that can be used to carry or store desired program code in the form of instructions or data structures and that can be accessed by a computer. Combinations of the above should also be included within the scope of computer-readable media.

FIG. 1 is a diagram illustrating an LTE network architecture 100. The LTE network architecture 100 may be referred to as an Evolved Packet System (EPS) 100. The EPS 100 may include one or more user equipment (UE) 102, an Evolved UMTS Terrestrial Radio Access Network (E-UTRAN) 104, an Evolved Packet Core (EPC) 110, and an Operator's Internet Protocol (IP) Services 122. The EPS can interconnect with other access networks, but for simplicity those entities/interfaces are not shown. As shown, the EPS provides packet-switched services, however, as those skilled in the art will readily appreciate, the various concepts presented throughout this disclosure may be extended to networks providing circuit-switched services.

The E-UTRAN includes the evolved Node B (eNB) 106 and other eNBs 108, and may include a Multicast Coordination Entity (MCE) 128. The eNB 106 provides user and control planes protocol terminations toward the UE 102. The eNB 106 may be connected to the other eNBs 108 via a backhaul (e.g., an X2 interface). The MCE 128 allocates time/frequency radio resources for evolved Multimedia Broadcast Multicast Service (MBMS) (eMBMS), and determines the radio configuration (e.g., a modulation and coding scheme (MCS)) for the eMBMS. The MCE 128 may be a separate entity or part of the eNB 106. The eNB 106 may also be referred to as a base station, a Node B, an access point, a base transceiver station, a radio base station, a radio transceiver, a transceiver function, a basic service set (BSS), an extended service set (ESS), or some other suitable terminology. The eNB 106 provides an access point to the EPC 110 for a UE 102. Examples of UEs 102 include a cellular phone, a smart phone, a session initiation protocol (SIP) phone, a laptop, a personal digital assistant (PDA), a satellite radio, a global positioning system, a multimedia device, a video device, a digital audio player (e.g., MP3 player), a camera, a game console, a tablet, or any other similar functioning device. The UE 102 may also be referred to by those skilled in the art as a mobile station, a subscriber station, a mobile unit, a subscriber unit, a wireless unit, a remote unit, a mobile device, a wireless device, a wireless communications device, a remote device, a mobile subscriber station, an access terminal, a mobile terminal, a wireless terminal, a remote terminal, a handset, a user agent, a mobile client, a client, or some other suitable terminology.

The eNB 106 is connected to the EPC 110. The EPC 110 may include a Mobility Management Entity (MME) 112, a Home Subscriber Server (HSS) 120, other MMEs 114, a Serving Gateway 116, a Multimedia Broadcast Multicast Service (MBMS) Gateway 124, a Broadcast Multicast Service Center (BM-SC) 126, and a Packet Data Network (PDN) Gateway 118. The MME 112 is the control node that processes the signaling between the UE 102 and the EPC 110. Generally, the MME 112 provides bearer and connection management. All user IP packets are transferred through the Serving Gateway 116, which itself is connected to the PDN Gateway 118. The PDN Gateway 118 provides UE IP address allocation as well as other functions. The PDN Gateway 118 and the BM-SC 126 are connected to the IP Services 122. The IP Services 122 may include the Internet, an intranet, an IP Multimedia Subsystem (IMS), a PS Streaming Service (PSS), and/or other IP services. The BM-SC 126 may provide functions for MBMS user service provisioning and delivery. The BM-SC 126 may serve as an entry point for content provider MBMS transmission, may be used to authorize and initiate MBMS Bearer Services within a PLMN, and may be used to schedule and deliver MBMS transmissions. The MBMS Gateway 124 may be used to distribute MBMS traffic to the eNBs (e.g., 106, 108) belonging to a Multicast Broadcast Single Frequency Network (MBSFN) area broadcasting a particular service, and may be responsible for session management (start/stop) and for collecting eMBMS related charging information.

Figure 2:
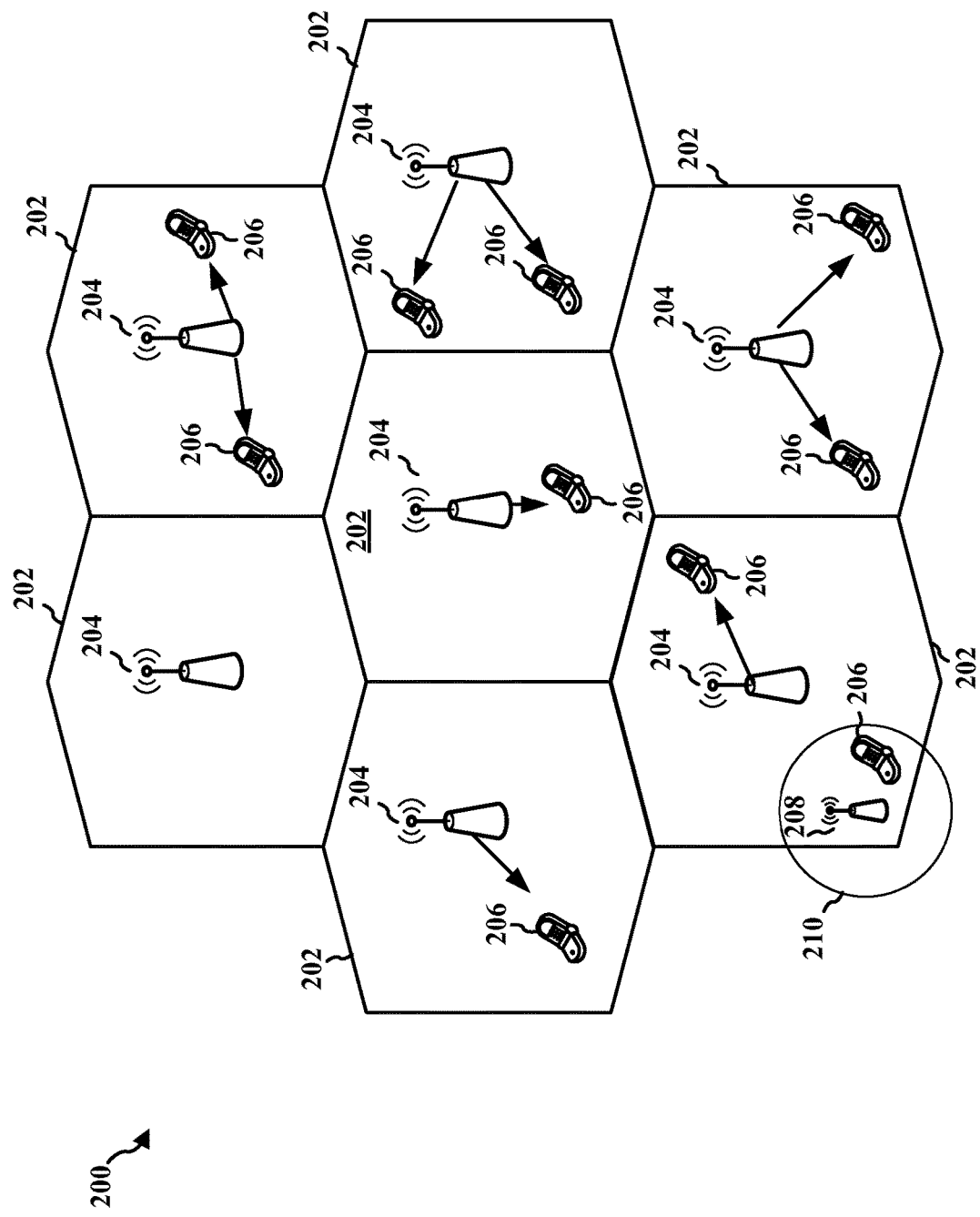
FIG. 2 is a diagram illustrating an example of an access network.

FIG. 2 is a diagram illustrating an example of an access network 200 in an LTE network architecture. In this example, the access network 200 is divided into a number of cellular regions (cells) 202. One or more lower power class eNBs 208 may have cellular regions 210 that overlap with one or more of the cells 202. The lower power class eNB 208 may be a femto cell (e.g., home eNB (HeNB)), pico cell, micro cell, or remote radio head (RRH). The macro eNBs 204 are each assigned to a respective cell 202 and are configured to provide an access point to the EPC 110 for all the UEs 206 in the cells 202. There is no centralized controller in this example of an access network 200, but a centralized controller may be used in alternative configurations. The eNBs 204 are responsible for all radio related functions including radio bearer control, admission control, mobility control, scheduling, security, and connectivity to the serving gateway 116. An eNB may support one or multiple (e.g., three) cells (also referred to as a sectors). The term "cell" can refer to the smallest coverage area of an eNB and/or an eNB subsystem serving are particular coverage area. Further, the terms "eNB," "base station," and "cell" may be used interchangeably herein.

The modulation and multiple access scheme employed by the access network 200 may vary depending on the particular telecommunications standard being deployed. In LTE applications, OFDM is used on the DL and SC-FDMA is used on the UL to support both frequency division duplex (FDD) and time division duplex (TDD). As those skilled in the art will readily appreciate from the detailed description to follow, the various concepts presented herein are well suited for LTE applications. However, these concepts may be readily extended to other telecommunication standards employing other modulation and multiple access techniques. By way of example, these concepts may be extended to Evolution-Data Optimized (EV-DO) or Ultra Mobile Broadband (UMB). EV-DO and UMB are air interface standards promulgated by the 3rd Generation Partnership Project 2 (3GPP2) as part of the CDMA2000 family of standards and employs CDMA to provide broadband Internet access to mobile stations. These concepts may also be extended to Universal Terrestrial Radio Access (UTRA) employing Wideband-CDMA (W-CDMA) and other variants of CDMA, such as TD-SCDMA; Global System for Mobile Communications (GSM) employing TDMA; and Evolved UTRA (E-UTRA), IEEE 802.11 (Wi-Fi), IEEE 802.16 (WiMAX), IEEE 802.20, and Flash-OFDM employing OFDMA. UTRA, E-UTRA, UMTS, LTE and GSM are described in documents from the 3GPP organization. CDMA2000 and UMB are described in documents from the 3GPP2 organization. The actual wireless communication standard and the multiple access technology employed will depend on the specific application and the overall design constraints imposed on the system.

The eNBs 204 may have multiple antennas supporting MIMO technology. The use of MIMO technology enables the eNBs 204 to exploit the spatial domain to support spatial multiplexing, beamforming, and transmit diversity. Spatial multiplexing may be used to transmit different streams of data simultaneously on the same frequency. The data streams may be transmitted to a single UE 206 to increase the data rate or to multiple UEs 206 to increase the overall system capacity. This is achieved by spatially precoding each data stream (i.e., applying a scaling of an amplitude and a phase) and then transmitting each spatially precoded stream through multiple transmit antennas on the DL. The spatially precoded data streams arrive at the UE(s) 206 with different spatial signatures, which enables each of the UE(s) 206 to recover the one or more data streams destined for that UE 206. On the UL, each UE 206 transmits a spatially precoded data stream, which enables the eNB 204 to identify the source of each spatially precoded data stream.

Spatial multiplexing is generally used when channel conditions are good. When channel conditions are less favorable, beamforming may be used to focus the transmission energy in one or more directions. This may be achieved by spatially precoding the data for transmission through multiple antennas. To achieve good coverage at the edges of the cell, a single stream beamforming transmission may be used in combination with transmit diversity.

In the detailed description that follows, various aspects of an access network will be described with reference to a MIMO system supporting OFDM on the DL. OFDM is a spread-spectrum technique that modulates data over a number of subcarriers within an OFDM symbol. The subcarriers are spaced apart at precise frequencies. The spacing provides "orthogonality" that enables a receiver to recover the data from the subcarriers. In the time domain, a guard interval (e.g., cyclic prefix) may be added to each OFDM symbol to combat inter-OFDM-symbol interference. The UL may use SC-FDMA in the form of a DFT-spread OFDM signal to compensate for high peak-to-average power ratio (PAPR).

Figure 3:
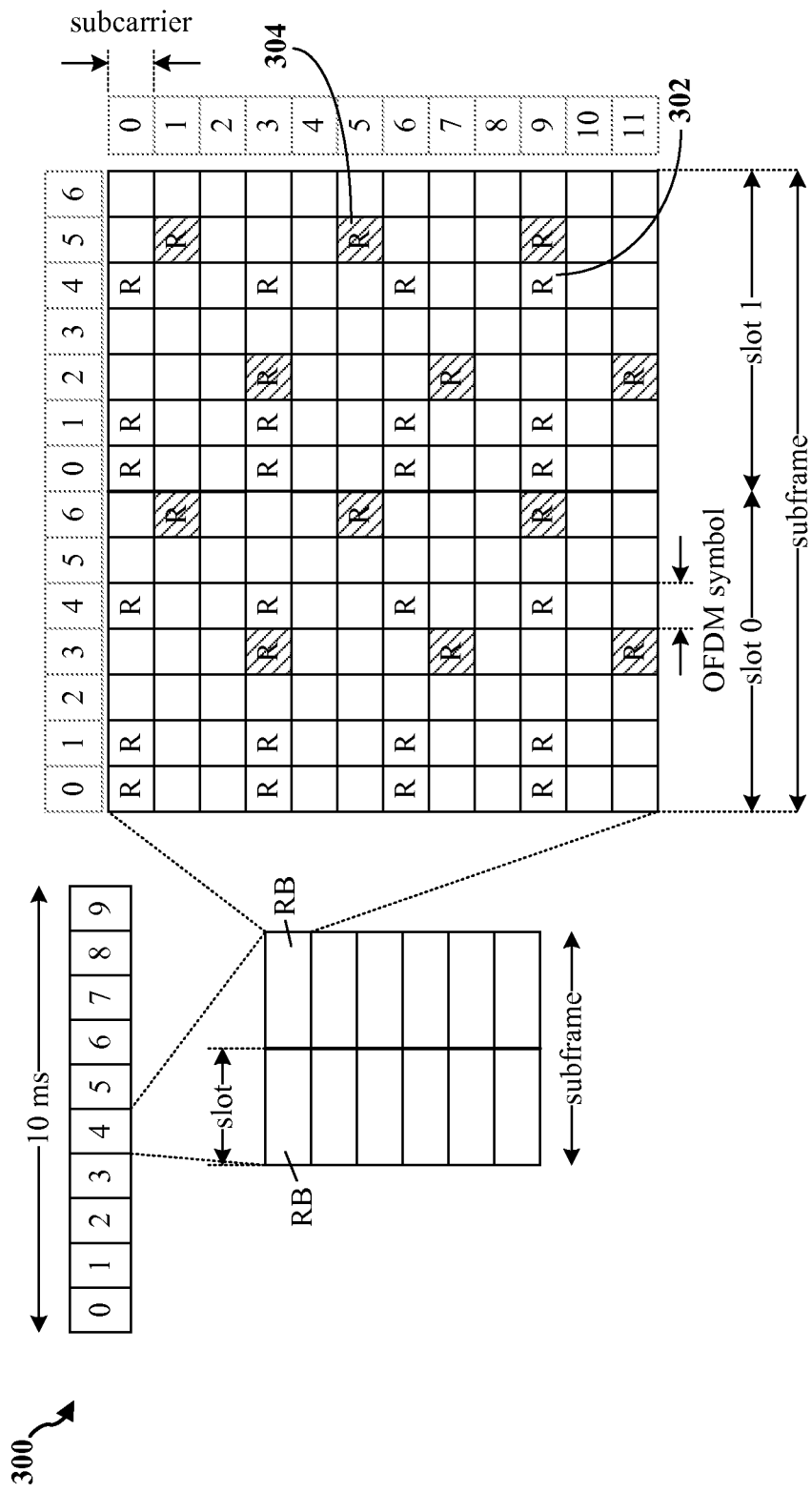
FIG. 3 is a diagram illustrating an example of a DL frame structure in LTE.

FIG. 3 is a diagram 300 illustrating an example of a DL frame structure in LTE. A frame (10 ms) may be divided into 10 equally sized subframes. Each subframe may include two consecutive time slots. A resource grid may be used to represent two time slots, each time slot including a resource block. The resource grid is divided into multiple resource elements. In LTE, for a normal cyclic prefix, a resource block contains 12 consecutive subcarriers in the frequency domain and 7 consecutive OFDM symbols in the time domain, for a total of 84 resource elements. For an extended cyclic prefix, a resource block contains 6 consecutive OFDM symbols in the time domain for a total of 72 resource elements. Some of the resource elements, indicated as R 302, 304, include DL reference signals (DL-RS). The DL-RS include Cell-specific RS (CRS) (also sometimes called common RS) 302 and UE-specific RS (UE-RS) 304. UE-RS 304 are transmitted only on the resource blocks upon which the corresponding physical DL shared channel (PDSCH) is mapped. The number of bits carried by each resource element depends on the modulation scheme. Thus, the more resource blocks that a UE receives and the higher the modulation scheme, the higher the data rate for the UE.

Figure 4:
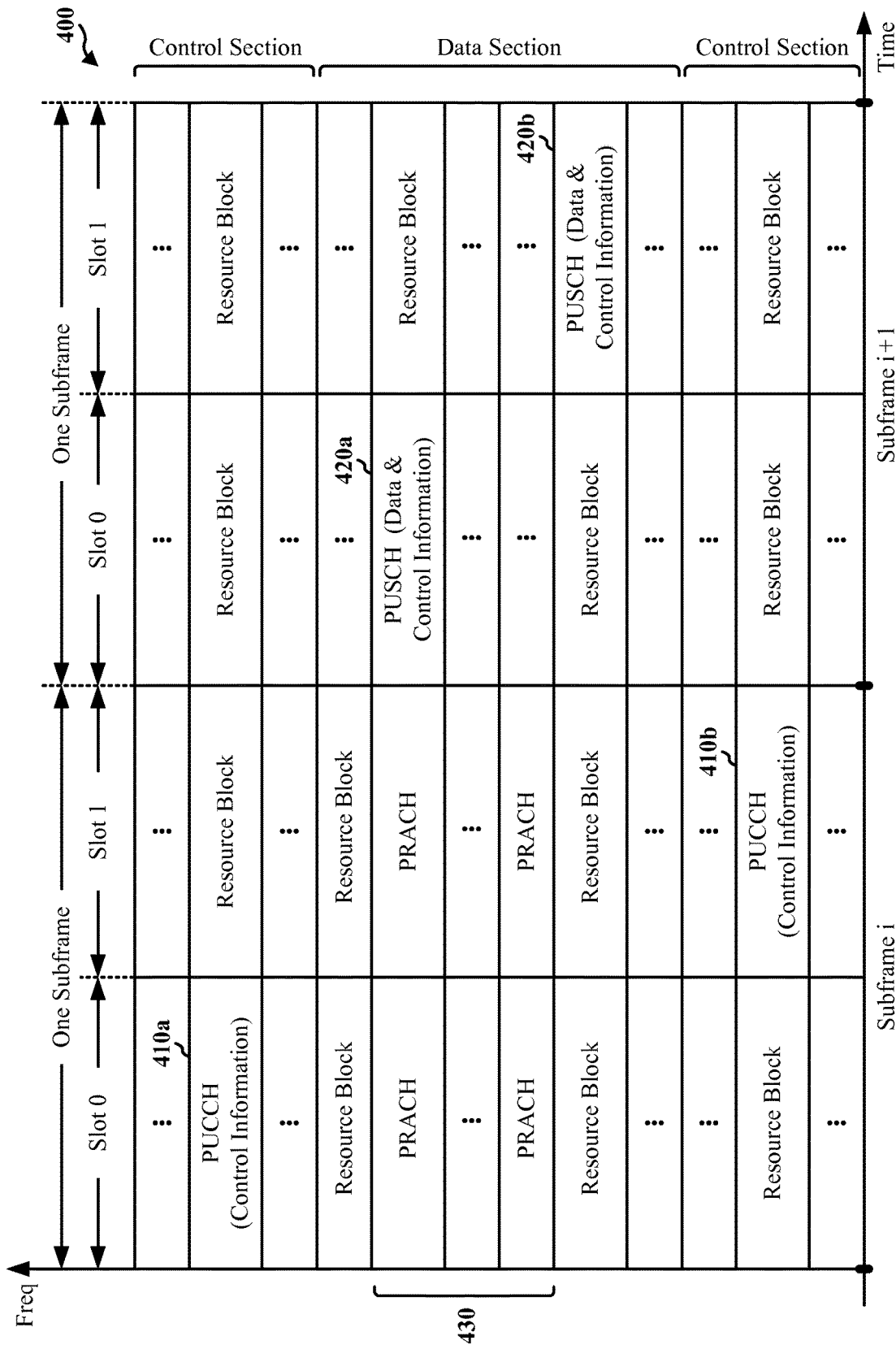
FIG. 4 is a diagram illustrating an example of an UL frame structure in LTE.

FIG. 4 is a diagram 400 illustrating an example of an UL frame structure in LTE. The available resource blocks for the UL may be partitioned into a data section and a control section. The control section may be formed at the two edges of the system bandwidth and may have a configurable size. The resource blocks in the control section may be assigned to UEs for transmission of control information. The data section may include all resource blocks not included in the control section. The UL frame structure results in the data section including contiguous subcarriers, which may allow a single UE to be assigned all of the contiguous subcarriers in the data section.

A UE may be assigned resource blocks 410a, 410b in the control section to transmit control information to an eNB. The UE may also be assigned resource blocks 420a, 420b in the data section to transmit data to the eNB. The UE may transmit control information in a physical UL control channel (PUCCH) on the assigned resource blocks in the control section. The UE may transmit only data or both data and control information in a physical UL shared channel (PUSCH) on the assigned resource blocks in the data section. A UL transmission may span both slots of a subframe and may hop across frequency.

A set of resource blocks may be used to perform initial system access and achieve UL synchronization in a physical random access channel (PRACH) 430. The PRACH 430 carries a random sequence and cannot carry any UL data/signaling. Each random access preamble occupies a bandwidth corresponding to six consecutive resource blocks. The starting frequency is specified by the network. That is, the transmission of the random access preamble is restricted to certain time and frequency resources. There is no frequency hopping for the PRACH. The PRACH attempt is carried in a single subframe (1 ms) or in a sequence of few contiguous subframes and a UE can make only a single PRACH attempt per frame (10 ms).

Figure 5:
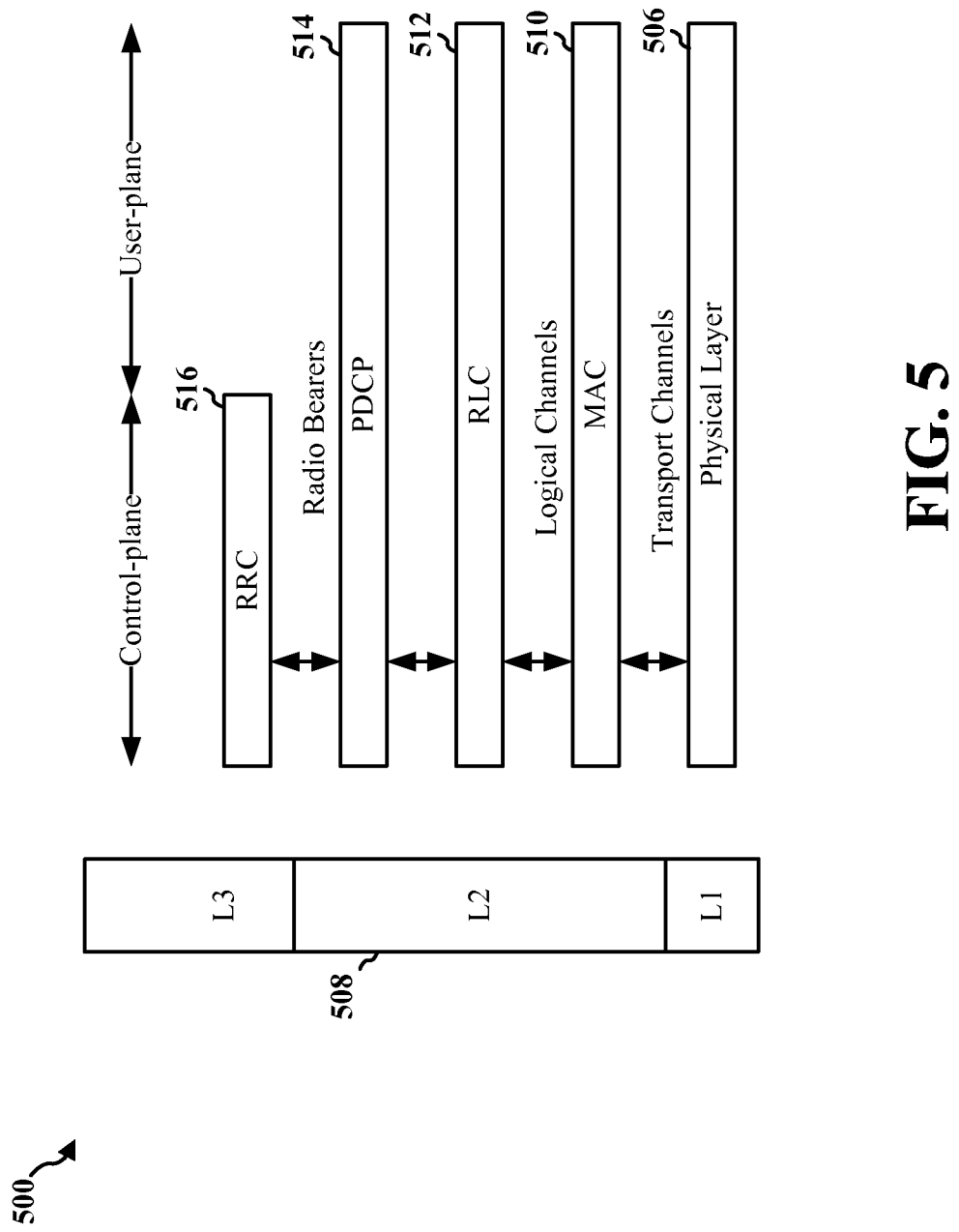
FIG. 5 is a diagram illustrating an example of a radio protocol architecture for the user and control planes.

FIG. 5 is a diagram 500 illustrating an example of a radio protocol architecture for the user and control planes in LTE. The radio protocol architecture for the UE and the eNB is shown with three layers: Layer 1, Layer 2, and Layer 3. Layer 1 (L1 layer) is the lowest layer and implements various physical layer signal processing functions. The L1 layer will be referred to herein as the physical layer 506. Layer 2 (L2 layer) 508 is above the physical layer 506 and is responsible for the link between the UE and eNB over the physical layer 506.

In the user plane, the L2 layer 508 includes a media access control (MAC) sublayer 510, a radio link control (RLC) sublayer 512, and a packet data convergence protocol (PDCP) 514 sublayer, which are terminated at the eNB on the network side. Although not shown, the UE may have several upper layers above the L2 layer 508 including a network layer (e.g., IP layer) that is terminated at the PDN gateway 118 on the network side, and an application layer that is terminated at the other end of the connection (e.g., far end UE, server, etc.).

The PDCP sublayer 514 provides multiplexing between different radio bearers and logical channels. The PDCP sublayer 514 also provides header compression for upper layer data packets to reduce radio transmission overhead, security by ciphering the data packets, and handover support for UEs between eNBs. The RLC sublayer 512 provides segmentation and reassembly of upper layer data packets, retransmission of lost data packets, and reordering of data packets to compensate for out-of-order reception due to hybrid automatic repeat request (HARM). The MAC sublayer 510 provides multiplexing between logical and transport channels. The MAC sublayer 510 is also responsible for allocating the various radio resources (e.g., resource blocks) in one cell among the UEs. The MAC sublayer 510 is also responsible for HARQ operations.

In the control plane, the radio protocol architecture for the UE and eNB is substantially the same for the physical layer 506 and the L2 layer 508 with the exception that there is no header compression function for the control plane. The control plane also includes a radio resource control (RRC) sublayer 516 in Layer 3 (L3 layer). The RRC sublayer 516 is responsible for obtaining radio resources (e.g., radio bearers) and for configuring the lower layers using RRC signaling between the eNB and the UE.

Figure 6:
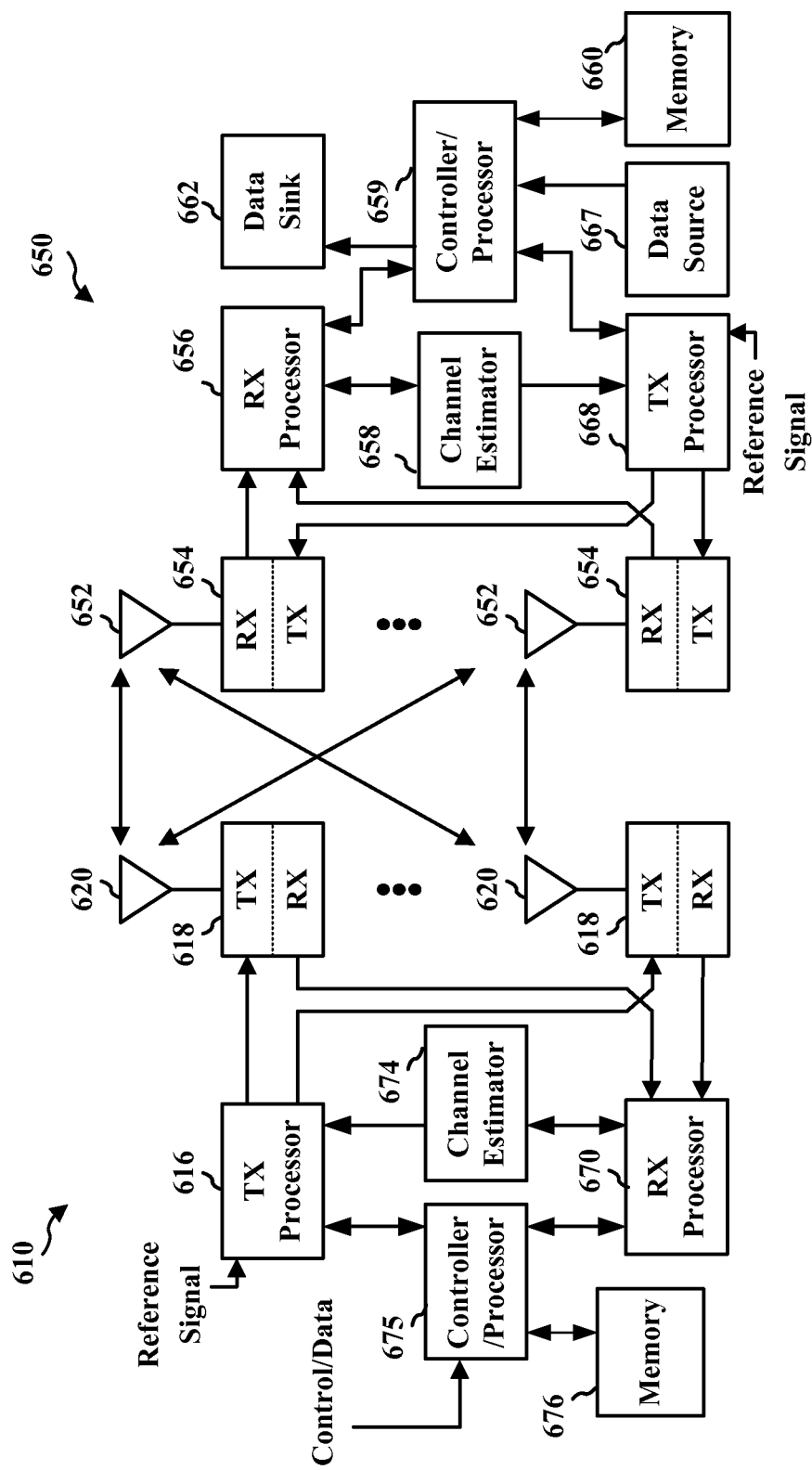
FIG. 6 is a diagram illustrating an example of an evolved Node B and user equipment in an access network.

FIG. 6 is a block diagram of an eNB 610 in communication with a UE 650 in an access network. In the DL, upper layer packets from the core network are provided to a controller/processor 675. The controller/processor 675 implements the functionality of the L2 layer. In the DL, the controller/processor 675 provides header compression, ciphering, packet segmentation and reordering, multiplexing between logical and transport channels, and radio resource allocations to the UE 650 based on various priority metrics. The controller/processor 675 is also responsible for HARQ operations, retransmission of lost packets, and signaling to the UE 650.

The transmit (TX) processor 616 implements various signal processing functions for the L1 layer (i.e., physical layer). The signal processing functions include coding and interleaving to facilitate forward error correction (FEC) at the UE 650 and mapping to signal constellations based on various modulation schemes (e.g., binary phase-shift keying (BPSK), quadrature phase-shift keying (QPSK), M-phase-shift keying (M-PSK), M-quadrature amplitude modulation (M-QAM)). The coded and modulated symbols are then split into parallel streams. Each stream is then mapped to an OFDM subcarrier, multiplexed with a reference signal (e.g., pilot) in the time and/or frequency domain, and then combined together using an Inverse Fast Fourier Transform (IFFT) to produce a physical channel carrying a time domain OFDM symbol stream. The OFDM stream is spatially precoded to produce multiple spatial streams. Channel estimates from a channel estimator 674 may be used to determine the coding and modulation scheme, as well as for spatial processing. The channel estimate may be derived from a reference signal and/or channel condition feedback transmitted by the UE 650. Each spatial stream may then be provided to a different antenna 620 via a separate transmitter 618TX. Each transmitter 618TX may modulate an RF carrier with a respective spatial stream for transmission.

At the UE 650, each receiver 654RX receives a signal through its respective antenna 652. Each receiver 654RX recovers information modulated onto an RF carrier and provides the information to the receive (RX) processor 656.

The RX processor 656 implements various signal processing functions of the L1 layer. The RX processor 656 may perform spatial processing on the information to recover any spatial streams destined for the UE 650. If multiple spatial streams are destined for the UE 650, they may be combined by the RX processor 656 into a single OFDM symbol stream. The RX processor 656 then converts the OFDM symbol stream from the time-domain to the frequency domain using a Fast Fourier Transform (FFT). The frequency domain signal comprises a separate OFDM symbol stream for each subcarrier of the OFDM signal. The symbols on each subcarrier, and the reference signal, are recovered and demodulated by determining the most likely signal constellation points transmitted by the eNB 610. These soft decisions may be based on channel estimates computed by the channel estimator 658. The soft decisions are then decoded and deinterleaved to recover the data and control signals that were originally transmitted by the eNB 610 on the physical channel. The data and control signals are then provided to the controller/processor 659.

The controller/processor 659 implements the L2 layer. The controller/processor can be associated with a memory 660 that stores program codes and data. The memory 660 may be referred to as a computer-readable medium. In the UL, the controller/processor 659 provides demultiplexing between transport and logical channels, packet reassembly, deciphering, header decompression, control signal processing to recover upper layer packets from the core network. The upper layer packets are then provided to a data sink 662, which represents all the protocol layers above the L2 layer. Various control signals may also be provided to the data sink 662 for L3 processing. The controller/processor 659 is also responsible for error detection using an acknowledgement (ACK) and/or negative acknowledgement (NACK) protocol to support HARQ operations.

In the UL, a data source 667 is used to provide upper layer packets to the controller/processor 659. The data source 667 represents all protocol layers above the L2 layer. Similar to the functionality described in connection with the DL transmission by the eNB 610, the controller/processor 659 implements the L2 layer for the user plane and the control plane by providing header compression, ciphering, packet segmentation and reordering, and multiplexing between logical and transport channels based on radio resource allocations by the eNB 610. The controller/processor 659 is also responsible for HARQ operations, retransmission of lost packets, and signaling to the eNB 610.

Channel estimates derived by a channel estimator 658 from a reference signal or feedback transmitted by the eNB 610 may be used by the TX processor 668 to select the appropriate coding and modulation schemes, and to facilitate spatial processing. The spatial streams generated by the TX processor 668 may be provided to different antenna 652 via separate transmitters 654TX. Each transmitter 654TX may modulate an RF carrier with a respective spatial stream for transmission.

The UL transmission is processed at the eNB 610 in a manner similar to that described in connection with the receiver function at the UE 650. Each receiver 618RX receives a signal through its respective antenna 620. Each receiver 618RX recovers information modulated onto an RF carrier and provides the information to a RX processor 670. The RX processor 670 may implement the L1 layer.

The controller/processor 675 implements the L2 layer. The controller/processor 675 can be associated with a memory 676 that stores program codes and data. The memory 676 may be referred to as a computer-readable medium. In the UL, the control/processor 675 provides demultiplexing between transport and logical channels, packet reassembly, deciphering, header decompression, control signal processing to recover upper layer packets from the UE 650. Upper layer packets from the controller/processor 675 may be provided to the core network. The controller/processor 675 is also responsible for error detection using an ACK and/or NACK protocol to support HARQ operations.

Figure 7:
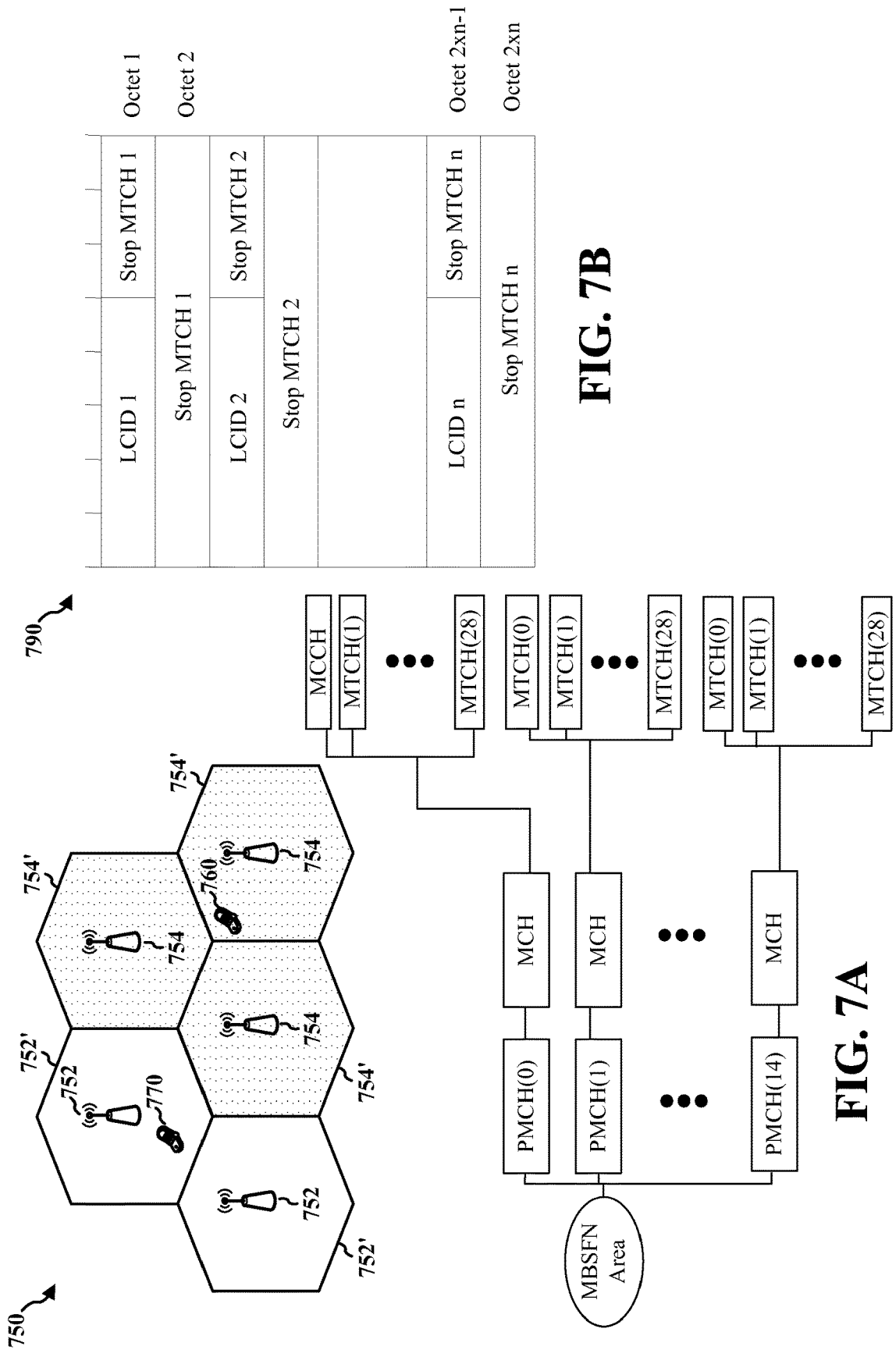
FIG. 7A is a diagram illustrating an example of an evolved Multimedia Broadcast Multicast Service channel configuration in a Multicast Broadcast Single Frequency Network.
FIG. 7B is a diagram illustrating a format of a Multicast Channel Scheduling Information Media Access Control control element.

FIG. 7A is a diagram 750 illustrating an example of an evolved MBMS (eMBMS) channel configuration in an MBSFN. The eNBs 752 in cells 752' may form a first MBSFN area and the eNBs 754 in cells 754' may form a second MBSFN area. The eNBs 752, 754 may each be associated with other MBSFN areas, for example, up to a total of eight MBSFN areas. A cell within an MBSFN area may be designated a reserved cell. Reserved cells do not provide multicast/broadcast content, but are time-synchronized to the cells 752', 754' and may have restricted power on MBSFN resources in order to limit interference to the MBSFN areas. Each eNB in an MBSFN area synchronously transmits the same eMBMS control information and data. Each area may support broadcast, multicast, and unicast services. A unicast service is a service intended for a specific user, e.g., a voice call. A multicast service is a service that may be received by a group of users, e.g., a subscription video service. A broadcast service is a service that may be received by all users, e.g., a news broadcast. Referring to FIG. 7A, the first MBSFN area may support a first eMBMS broadcast service, such as by providing a particular news broadcast to UE 770. The second MBSFN area may support a second eMBMS broadcast service, such as by providing a different news broadcast to UE 760. Each MBSFN area supports a plurality of physical multicast channels (PMCH) (e.g., 15 PMCHs). Each PMCH corresponds to a multicast channel (MCH). Each MCH can multiplex a plurality (e.g., 29) of multicast logical channels. Each MBSFN area may have one multicast control channel (MCCH). As such, one MCH may multiplex one MCCH and a plurality of multicast traffic channels (MTCHs) and the remaining MCHs may multiplex a plurality of MTCHs.

A UE can camp on an LTE cell to discover the availability of eMBMS service access and a corresponding access stratum configuration. In a first step, the UE may acquire a system information block (SIB) 13 (SIB13). In a second step, based on the SIB13, the UE may acquire an MBSFN Area Configuration message on an MCCH. In a third step, based on the MBSFN Area Configuration message, the UE may acquire an MCH scheduling information (MSI) MAC control element. The SIB13 may indicate (1) an MBSFN area identifier of each MBSFN area supported by the cell; (2) information for acquiring the MCCH such as an MCCH repetition period (e.g., 32, 64, . . . , 256 frames), an MCCH offset (e.g., 0, 1, . . . , 10 frames), an MCCH modification period (e.g., 512, 1024 frames), a signaling modulation and coding scheme (MCS), subframe allocation information indicating which subframes of the radio frame as indicated by repetition period and offset can transmit MCCH; and (3) an MCCH change notification configuration. There is one MBSFN Area Configuration message for each MBSFN area. The MBSFN Area Configuration message may indicate (1) a temporary mobile group identity (TMGI) and an optional session identifier of each MTCH identified by a logical channel identifier within the PMCH, and (2) allocated resources (i.e., radio frames and subframes) for transmitting each PMCH of the MBSFN area and the allocation period (e.g., 4, 8, . . . , 256 frames) of the allocated resources for all the PMCHs in the area, and (3) an MCH scheduling period (MSP) (e.g., 8, 16, 32, . . . , or 1024 radio frames) over which the MSI MAC control element is transmitted.

FIG. 7B is a diagram 790 illustrating the format of an MSI MAC control element. The MSI MAC control element may be sent once each MSP. The MSI MAC control element may be sent in the first subframe of each scheduling period of the PMCH. The MSI MAC control element can indicate the stop frame and subframe of each MTCH within the PMCH. There may be one MSI per PMCH per MBSFN area.

For different modulation orders, the required channel estimate quality for demodulation may be different. Further, for different modulation orders, the required data to reference signal power ratio (also referred to as traffic to pilot (T2P) ratio) for optimizing performance may be different. There is a need for methods that allow a UE to optimize its performance.

Figure 8:
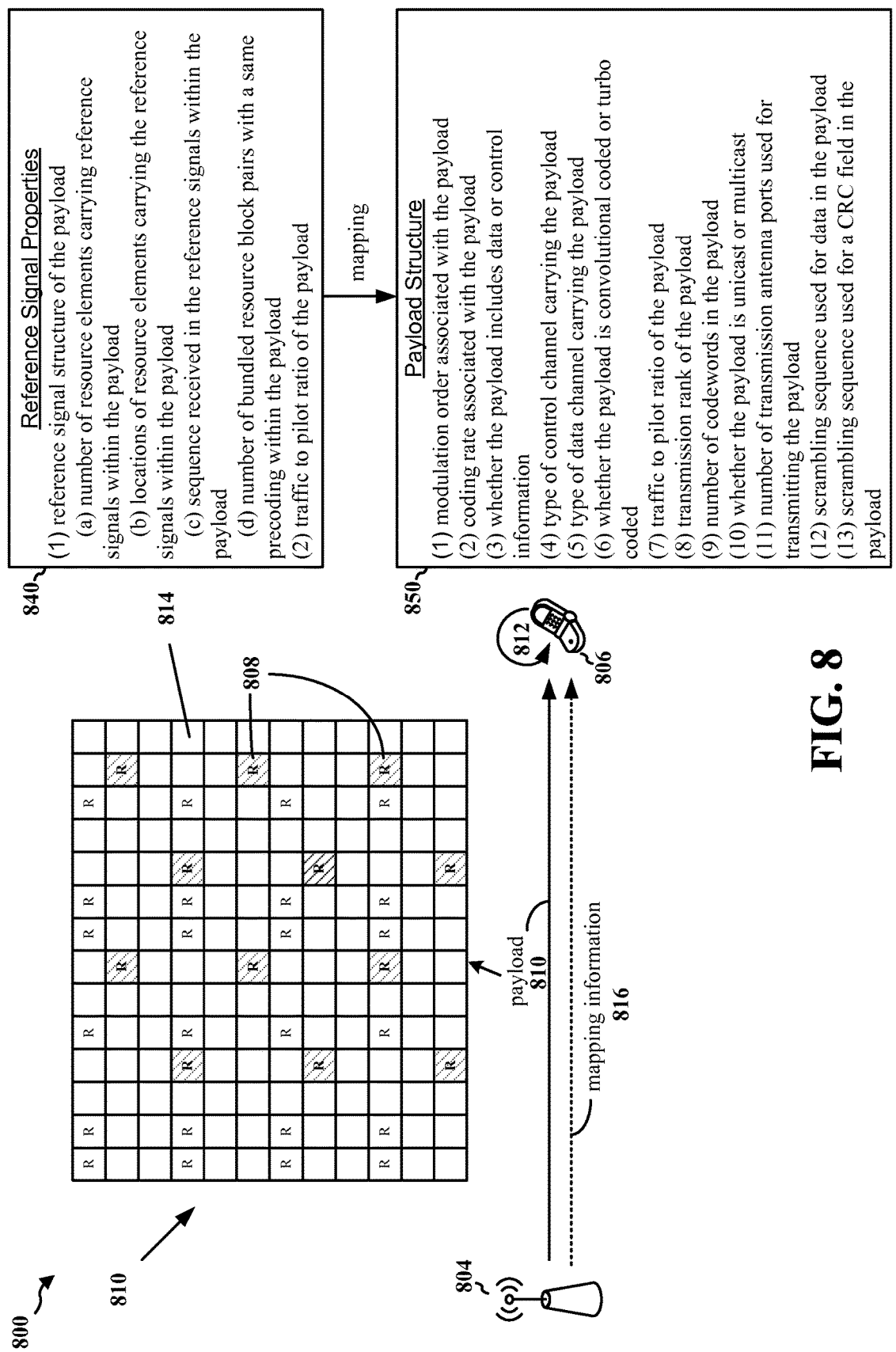
FIG. 8 is a diagram illustrating an exemplary method.

FIG. 8 is a diagram 800 illustrating an exemplary method. As illustrated in FIG. 8, the eNB 804 sends a payload 810 (downlink transmission) to the UE 806. The UE 806 identifies properties associated with reference signals 808 of a received payload 810. The reference signals 808 may be UE-RS (see also FIG. 3, the UE-RS 304). The properties associated with the reference signals 808 of the received payload 810 may include a reference signal structure of the reference signals 808 and/or a T2P ratio. In addition, the UE 806 determines 812 a payload structure of the payload 810 based on the identified properties. The UE 806 then decodes the received payload 810 based on the determined payload structure. The eNB 804 may signal to the UE 806 a payload structure of the payload 810 by constructing the payload 810 with certain properties associated with reference signals 808 of the payload 810. Accordingly, the eNB 804 may adjust a reference signal structure or a T2P ratio of the payload 810 in order to indicate to the UE 806 a payload structure of the payload 810.

The UE 806 may receive mapping information 816 indicating a mapping between possible properties associated with reference signals 808 and possible payload structures. The UE 806 may receive the mapping information 816 from the eNB 804 through a broadcast or RRC signaling. Alternatively, the mapping information may be preprogrammed into the UE 806. The properties associated with the reference signals 808 of the received payload 810 may include a reference signal structure of the payload 810 and/or a T2P of the payload 810 (see box 840). The reference signal structure may include at least one of a number of resource elements carrying the reference signals 808 within the payload 810, locations of resource elements carrying the reference signals 808 within the payload 810, a sequence (or signature) received in the reference signals 808 within the payload 810, or a number of bundled resource block pairs with the same precoding within the payload 810. The UE 806 may determine the number of resource elements carrying the reference signals 808 within the payload 810 and/or the locations of resource elements carrying the reference signals 808 within the payload 810 by comparing the information received in resource elements that may carry reference signals 808 to sequences known to be within the reference signals 808. The payload structure may include at least one of a modulation order associated with the payload 810, a coding rate associated with the payload 810, whether the payload 810 includes data or control information, a type of control channel carrying the payload 810, a type of data channel carrying the payload 810, whether the payload 810 is convolutional coded or turbo coded, a T2P ratio of the payload 810, a transmission rank (a number of spatial layers)

of the payload 810, a number of codewords in the payload 810, whether the payload 810 is unicast or multicast, a number of transmission antenna ports used for transmitting the payload 810, a scrambling sequence used for data in the payload 810, or a scrambling sequence used for a cyclic redundancy check (CRC) field in the payload 810 (see box 850). The modulation order and the coding rate may together be referred to as an MCS.

In one example, the UE 806 may identify the properties associated with the reference signals 808 of the received payload 810 by determining a number of resource elements carrying the reference signals 808 within the payload 810, and may determine the payload structure by determining at least one of a modulation order or a coding rate (or together an MCS) associated with the payload 810 based on the determined number of the resource elements carrying the reference signals 808 within the payload 810. For example, if the UE 806 determines that there are 12 UE-RS resource elements per physical resource block (PRB) pair, the UE 806 may determine that the modulation order of the payload 810 is QPSK, 16-QAM, or 64-QAM, whereas if the UE 806 determines that there are 18 UE-RS resource elements per PRB pair, the UE 806 may determine that the modulation order of the payload 810 is 256-QAM.

The UE 806 may receive the reference signals 808 in a first set of resource elements known to carry reference signals 808 and a second set of resource elements known to carry data. For example, the resource element 814, which is known to carry data, may carry a reference signal. The UE 806 may be preprogrammed or signaled (e.g., through RRC signaling) to know that the resource element 814 will carry reference signals 808. Accordingly, the UE 806 may identify properties associated with the reference signals 808 that are received in the first and second sets of resource elements within a payload 810, and then consult the mapping information 816 to determine a payload structure based on the identified properties. The UE 806 may then decode the received payload 810 based on the determined payload structure.

In one example, the UE 806 may determine the number of resource elements carrying reference signals 808 within the payload 810, and may determine the transmission rank of the payload 810 based on the determined number of resource elements carrying reference signals 808. Accordingly, the UE 806 may determine the payload structure by determining a transmission rank (i.e., a number of spatial layers) associated with the payload 810 based on the determined number of the resource elements carrying the reference signals 808 within the payload 810. For example, if the UE 806 determines that there are 12 resource elements carrying UE-RS, the UE 806 may determine that the transmission rank of the payload 810 is two. However, if the UE 806 determines that there are 18 resource elements carrying UE-RS, the UE 806 may determine that the transmission rank of the payload 810 is greater than two.

In one example, the UE 806 determines a T2P ratio of the payload 810, and then determines at least one of a modulation order, a coding rate, a number of codewords, or a transmission rank (i.e., a number of spatial layers) associated with the payload 810 based on the determined T2P ratio. Accordingly, the UE 806 may identify the properties associated with the reference signals 808 of the received payload 810 by determining a T2P ratio of the payload 810, and may determine the payload structure by determining at least one of a modulation order, a coding rate, a number of codewords, or a transmission rank (i.e., a number of spatial layers) associated with the payload 810 based on the determined T2P ratio. For example, if the UE 806 determines that the T2P ratio of the payload 810 is 0 dB, the UE 806 may determine that the modulation order of the payload 810 is QPSK, 16-QAM, or 64-QAM, whereas if the UE 806 determines that the T2P ratio of the payload 810 is 3dB, the UE 806 may determine that the modulation order of the payload 810 is 256-QAM.

In one example, the UE 806 determines a number of bundled PRB pairs with the same precoding, and then determines a modulation order and/or a coding rate (or together an MCS) of the payload 810 based on the number of bundled PRB pairs with the same precoding. Bundled resource block pairs include a plurality of time-concurrent resource block pairs that span multiple sets of 12 subcarriers at the same OFDM symbols (see FIG. 3). When the eNB bundles resource block pairs with the same precoding, the UE 806 can get a better estimate of the channel between the eNB 804 and the UE 806 by estimating the channel based on all of the reference signals 808 in the bundled resource block pairs. Specifically, the UE 806 may identify the properties associated with the reference signals 808 of the received payload 810 by determining a number of bundled resource block pairs with a same precoding, and may determine the payload structure by determining at least one of a modulation order or a coding rate based on the determined number of bundled resource block pairs with the same precoding. For example, if the UE 806 determines that the eNB 804 has bundled 3 PRB pairs with the same precoding in the payload 810, the UE 806 may determine that the modulation order of the payload 810 is QPSK, 16-QAM, or 64-QAM, whereas if the UE 806 determines that the eNB 804 has bundled 6 PRB pairs with the same precoding in the payload 810, the UE 806 may determine that the modulation order of the payload 810 is 256-QAM.

In one example, the UE 806 determines a reference signal structure of the payload 810, and determines a modulation order based on the determined reference signal structure. The UE 806 then determines a T2P ratio based on the determined modulation order. Subsequently, the UE 806 determines channel state information (CSI) based on the determined T2P ratio. The UE 806 then sends the determined CSI in a CSI report to the serving eNB 804. For example, the UE 806 may determine that a payload 810 has a particular reference signal structure (one or more of a number of resource elements carrying reference signals within the payload, a location of resource elements carrying the reference signals within the payload, a sequence received in the reference signals within the payload, and/or a number of bundled resource block pairs with a same precoding within the payload). Based on the determined reference signal structure, if the UE 806 determines that the modulation order is 256-QAM, the UE 806 may assume the T2P of the payload 810 is 3 dB when determining the CSI. However, if based on the determined reference signal structure the UE 806 determines that the modulation order is not 256-QAM (e.g., QPSK, 16-QAM, or 64-QAM), the UE 806 may assume the T2P of the payload 810 is 0 dB when determining the CSI.

Figure 9:
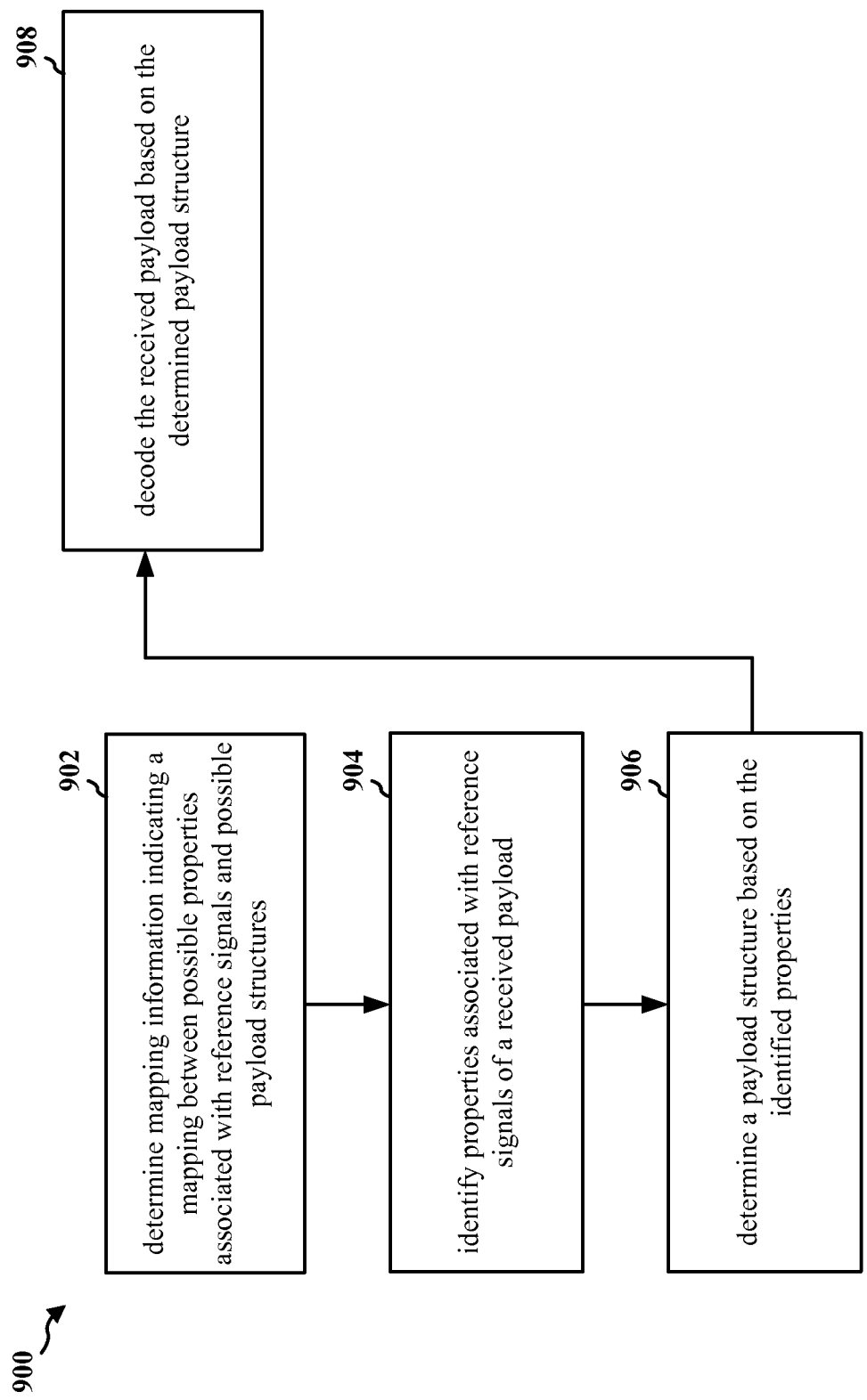
FIG. 9 is a flow chart of a first method of wireless communication.

FIG. 9 is a flow chart 900 of a first method of wireless communication. The method may be performed by a UE, such as the UE 806.

In step 902, a UE determines mapping information indicating a mapping between possible properties associated with reference signals and possible payload structures. The UE may be preprogrammed with the mapping information or may receive the mapping information through a broadcast or RRC signaling.

In step 904, the UE identifies properties associated with reference signals of a received payload. The properties may include a reference signal structure of the payload and/or a T2P ratio of the payload. The reference signal structure may include at least one of a number of resource elements carrying reference signals within the payload, locations of resource elements carrying the reference signals within the payload, a sequence received in the reference signals within the payload, or a number of bundled resource block pairs with a same precoding within the payload.

In step 906, the UE determines a payload structure based on the identified properties. The UE may determine the payload structure by consulting the mapping information to determine a mapping from the identified properties associated with reference signals of the received payload to a particular payload structure. The payload structure may include at least one of a modulation order associated with the payload, a coding rate associated with the payload, whether the payload includes data or control information, a type of control channel carrying the payload, a type of data channel carrying the payload, whether the payload is convolutional coded or turbo coded, a T2P ratio of the payload, a transmission rank of the payload, a number of codewords in the payload, whether the payload is unicast or multicast, a number of transmission antenna ports used for transmitting the payload, a scrambling sequence used for data in the payload, or a scrambling sequence used for a CRC field in the payload.

In step 908, the UE decodes the received payload based on the determined payload structure.

In one example, the UE may identify the properties associated with the reference signals of the received payload by determining a number of resource elements carrying reference signals within the payload, and the UE may determine the payload structure by determining at least one of a modulation order or a coding rate associated with the payload based on the determined number of the resource elements carrying the reference signals within the payload. In one example, the reference signals may be received in a first set of resource elements known to carry reference signals and a second set of resource elements known to carry data. In one example, the UE may determine the payload structure by determining a transmission rank associated with the payload based on the determined number of the resource elements carrying the reference signals within the payload. In one example, the UE may identify the properties associated with the reference signals of the received payload by determining a T2P ratio of the payload, and the UE may determine the payload structure by determining at least one of a modulation order, a coding rate, a number of codewords, or a transmission rank associated with the payload based on the determined T2P ratio. In one example, the UE may identify the properties associated with the reference signals of the received payload by determining a number of bundled resource block pairs with a same precoding, and the UE may determine the payload structure by determining at least one of a modulation order or a coding rate based on the determined number of bundled resource block pairs with the same precoding.

Figure 10:
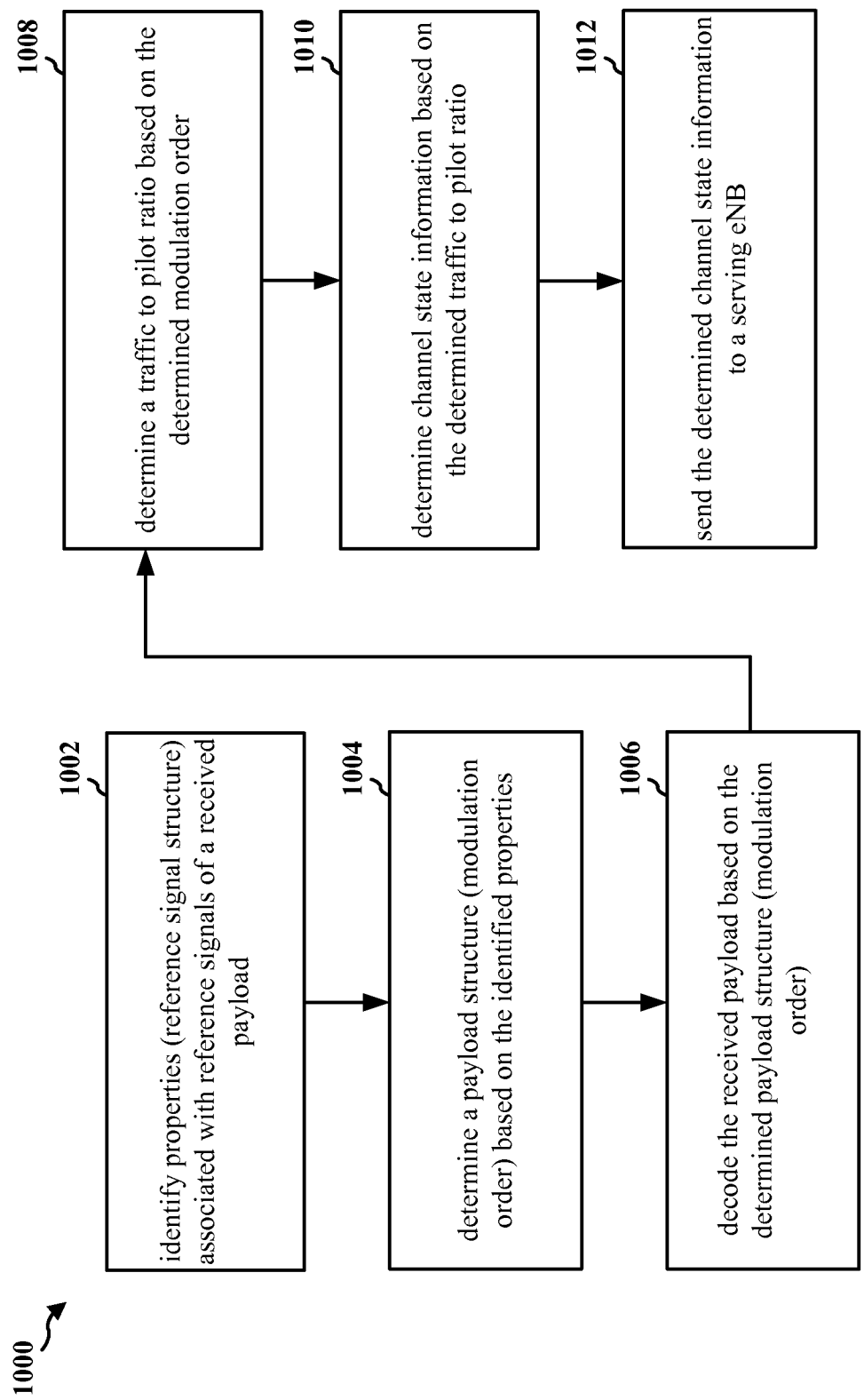
FIG. 10 is a flow chart of a second method of wireless communication.

FIG. 10 is a flow chart 1000 of a second method of wireless communication. The method may be performed by a UE, such as the UE 806.

In step 1002, a UE identifies properties associated with reference signals of a received payload. In particular, the UE determines a reference signal structure associated with reference signals of the received payload.

In step 1004, the UE determines a payload structure based on the identified properties. In particular, the UE determines a modulation order based on the determined reference signal structure.

In step 1006, the UE decodes the received payload based on the determined payload structure. In particular, the UE decodes the received payload based on the determined modulation order.

In step 1008, the UE determines a T2P ratio based on the determined modulation order. When determining the T2P ratio, the UE may assume a particular T2P ratio based on the modulation order when determining CSI. For example, the UE may assume the T2P ratio of the payload 810 is 0 dB for determining CSI when the modulation order of the payload 810 is QPSK, 16-QAM, or 64-QAM, and may assume the T2P ratio of the payload 810 is 3 dB when the modulation order of the payload 810 is 256-QAM.

In step 1010, the UE determines CSI based on the determined/expected/assumed T2P ratio.

In step 1012, the UE sends the determined CSI in a CSI report to a serving eNB.

Figure 11:
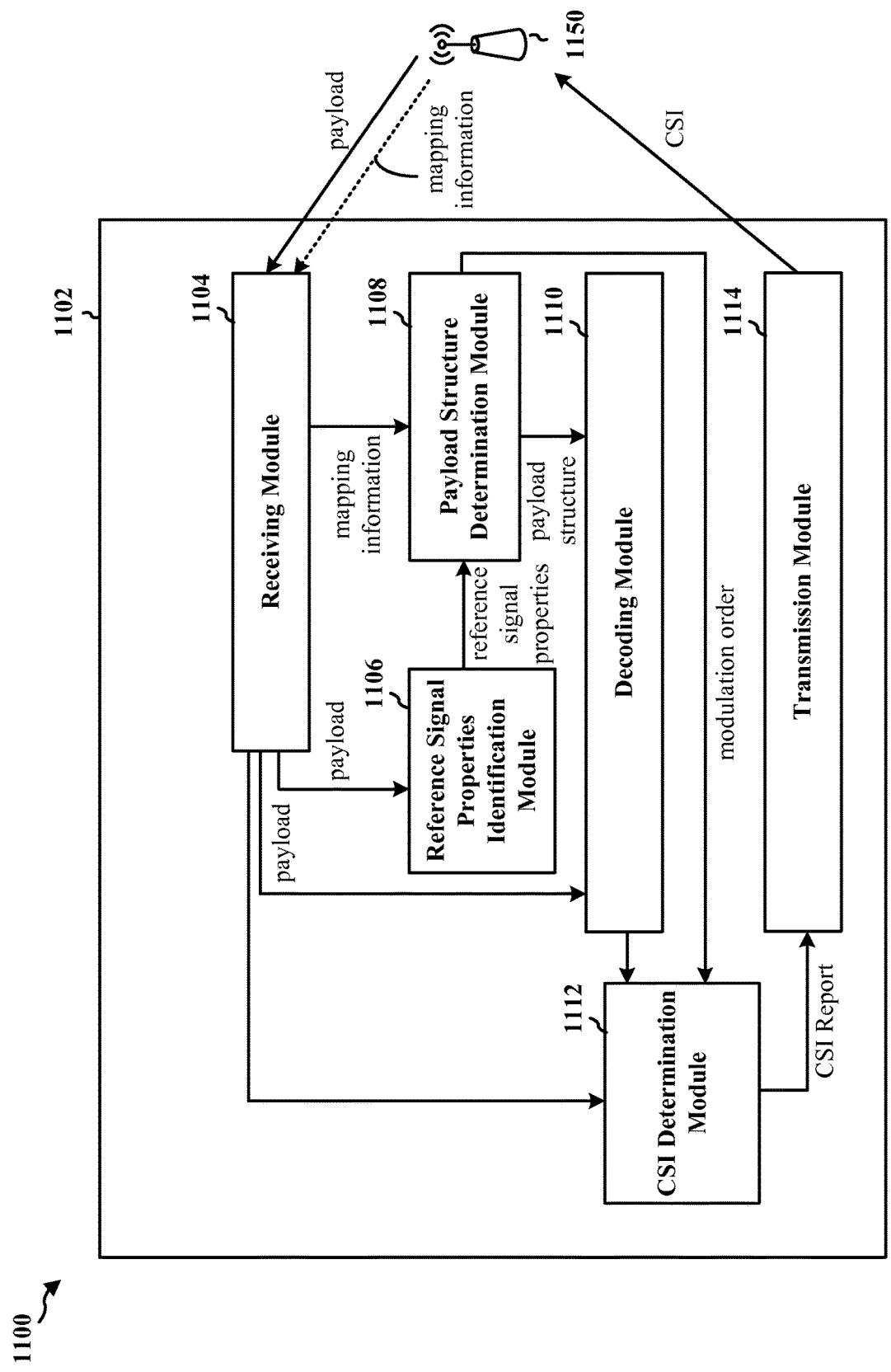
FIG. 11 is a conceptual data flow diagram illustrating the data flow between different modules/means/components in an exemplary apparatus.

FIG. 11 is a conceptual data flow diagram 1100 illustrating the data flow between different modules/means/components in an exemplary apparatus 1102. The apparatus may be a UE. The apparatus includes a receiving module 1104 that is configured to receive a payload from an eNB 1150. The receiving module 1104 is configured to provide the received payload to a reference signal properties identification module 1106 and a decoding module 1110. The reference signal properties identification module 1106 is configured to identify properties associated with reference signals of a received payload. The reference signal properties identification module 1106 is configured to provide information indicating the determined reference signal properties to a payload structure determination module 1108. The payload structure determination module 1108 is configured to determine a payload structure based on the identified properties. The payload structure determination module 1108 is configured to provide information indicating the determined payload structure to the decoding module 1110. The decoding module 1110 is configured to decode the received payload based on the determined payload structure.

The receiving module 1104 may be configured to receive mapping information indicating a mapping between possible properties associated with reference signals and possible payload structures. The receiving module 1104 may be configured to provide the mapping information to the payload structure determination module 1108. The payload structure determination module 1108 may be configured to determine the payload structure further based on the received mapping information. The mapping information may be preprogrammed or received from the eNB 1150 through a broadcast or RRC signaling.

The properties may include at least one of a reference signal structure of the payload or a T2P ratio of the payload, and the reference signal structure may include at least one of a number of resource elements carrying reference signals within the payload, locations of resource elements carrying the reference signals within the payload, a sequence received in the reference signals within the payload, or a number of bundled resource block pairs with a same precoding within the payload. The payload structure may include at least one of a modulation order associated with the payload, a coding rate associated with the payload, whether the payload includes data or control information, a type of control channel carrying the payload, a type of data channel carrying the payload, whether the payload is convolutional coded or turbo coded, a T2P ratio of the payload, a transmission rank of the payload, a number of codewords in the payload, whether the payload is unicast or multicast, a number of transmission antenna ports used for transmitting the payload, a scrambling sequence used for data in the payload, or a scrambling sequence used for a CRC field in the payload.

The reference signal properties identification module 1106 may be configured to identify the properties associated with the reference signals of the received payload by determining a number of resource elements carrying reference signals within the payload. The payload structure determination module 1108 may be configured to determine the payload structure by determining at least one of a modulation order or a coding rate associated with the payload based on the determined number of the resource elements carrying the reference signals within the payload. The reference signals may be received in a first set of resource elements known to carry reference signals and a second set of resource elements known to carry data. The payload structure determination module 1108 may be configured to determine the payload structure by determining a transmission rank associated with the payload based on the determined number of the resource elements carrying the reference signals within the payload.

The reference signal properties identification module 1106 may be configured to identify the properties associated with the reference signals of the received payload by determining a T2P ratio of the payload. The payload structure determination module 1108 may be configured to determine the payload structure by determining at least one of a modulation order, a coding rate, a number of codewords, or a transmission rank associated with the payload based on the determined T2P ratio.

The reference signal properties identification module 1106 may be configured to identify the properties associated with the reference signals of the received payload by determining a number of bundled resource block pairs with a same precoding. The payload structure determination module 1108 may be configured to determine the payload structure by determining at least one of a modulation order or a coding rate based on the determined number of bundled resource block pairs with the same precoding.

In one configuration, the properties include a reference signal structure of the payload, and the payload structure determination module 1108 is configured to determine the payload structure by determining a modulation order. In such a configuration, the apparatus may further include a CSI determination module 1112 that is configured to determine a T2P ratio based on the determined modulation order, and determine CSI based on the determined T2P ratio. The CSI determination module 1112 may be configured to provide the CSI in a CSI report to a transmission module 1114. The transmission module 1114 may be configured to send the determined CSI to the serving eNB 1150.

The apparatus may include additional modules that perform each of the steps of the algorithm in the aforementioned flow charts of FIGS. 9, 10. As such, each step in the aforementioned flow charts of FIGS. 9, 10 may be performed by a module and the apparatus may include one or more of those modules. The modules may be one or more hardware components specifically configured to carry out the stated processes/algorithm, implemented by a processor configured to perform the stated processes/algorithm, stored within a computer-readable medium for implementation by a processor, or some combination thereof.

Figure 12:
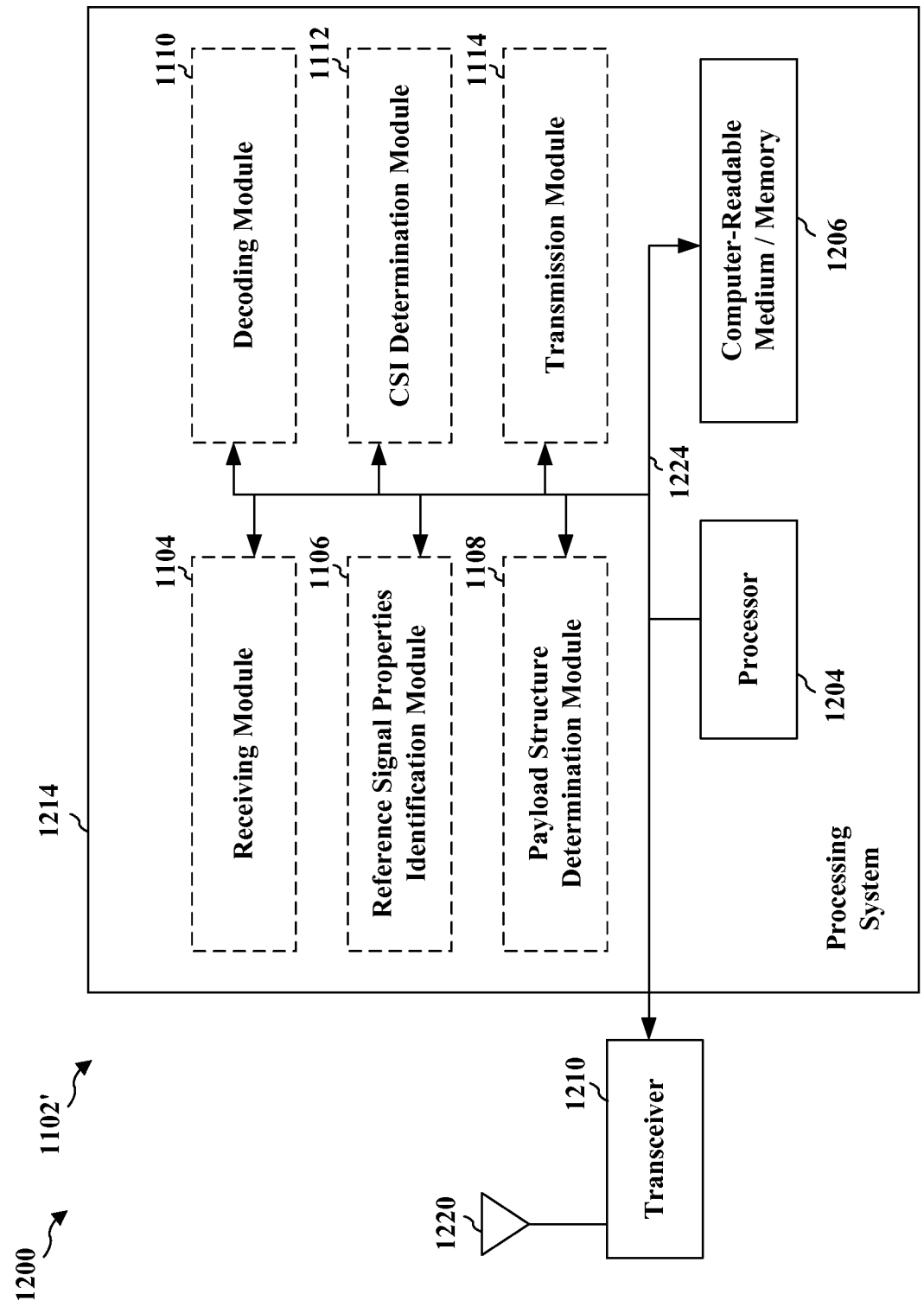
FIG. 12 is a diagram illustrating an example of a hardware implementation for an apparatus employing a processing system.

FIG. 12 is a diagram 1200 illustrating an example of a hardware implementation for an apparatus 1102' employing a processing system 1214. The processing system 1214 may be implemented with a bus architecture, represented generally by the bus 1224. The bus 1224 may include any number of interconnecting buses and bridges depending on the specific application of the processing system 1214 and the overall design constraints. The bus 1224 links together various circuits including one or more processors and/or hardware modules, represented by the processor 1204, the modules 1104, 1106, 1108, 1110, 1112, 1114, and the computer-readable medium/memory 1206. The bus 1224 may also link various other circuits such as timing sources, peripherals, voltage regulators, and power management circuits, which are well known in the art, and therefore, will not be described any further.

The processing system 1214 may be coupled to a transceiver 1210. The transceiver 1210 is coupled to one or more antennas 1220. The transceiver 1210 provides a means for communicating with various other apparatus over a transmission medium. The transceiver 1210 receives a signal from the one or more antennas 1220, extracts information from the received signal, and provides the extracted information to the processing system 1214. In addition, the transceiver 1210 receives information from the processing system 1214, and based on the received information, generates a signal to be applied to the one or more antennas 1220. The processing system 1214 includes a processor 1204 coupled to a computer-readable medium/memory 1206. The processor 1204 is responsible for general processing, including the execution of software stored on the computer-readable medium/memory 1206. The software, when executed by the processor 1204, causes the processing system 1214 to perform the various functions described supra for any particular apparatus. The computer-readable medium/memory 1206 may also be used for storing data that is manipulated by the processor 1204 when executing software. The processing system further includes at least one of the modules 1104, 1106, 1108, 1110, 1112, 1114. The modules may be software modules running in the processor 1204, resident/stored in the computer readable medium/memory 1206, one or more hardware modules coupled to the processor 1204, or some combination thereof. The processing system 1214 may be a component of the UE 650 and may include the memory 660 and/or at least one of the TX processor 668, the RX processor 656, and the controller/processor 659.

In one configuration, the apparatus 1102/1102' for wireless communication includes means for identifying properties associated with reference signals of a received payload, means for determining a payload structure based on the identified properties, and means for decoding the received payload based on the determined payload structure. The apparatus may further include means for receiving mapping information indicating a mapping between possible properties associated with reference signals and possible payload structures. The payload structure may be determined further based on the received mapping information. The means for identifying the properties associated with the reference signals of the received payload may be configured to determine a number of resource elements carrying reference signals within the payload, and the means for determining the payload structure may be configured to determine at least one of a modulation order or a coding rate associated with the payload based on the determined number of the resource elements carrying the reference signals within the payload. The means for determining the payload structure may be configured to determine a transmission rank associated with the payload based on the determined number of the resource elements carrying the reference signals within the payload. The means for identifying the properties associated with the reference signals of the received payload may be configured to determine a T2P ratio of the payload, and the means for determining the payload structure may be configured to determine at least one of a modulation order, a coding rate, a number of codewords, or a transmission rank associated with the payload based on the determined T2P ratio. The means for identifying the properties associated with the reference signals of the received payload may be configured to determine a number of bundled resource block pairs with a same precoding, and the means for determining the payload structure may be configured to determine at least one of a modulation order or a coding rate based on the determined number of bundled resource block pairs with the same precoding. The properties may include a reference signal structure of the payload, the means for determining the payload structure may be configured to determine a modulation order. The apparatus may further include means for determining a T2P ratio based on the determined modulation order, means for determining CSI based on the determined T2P ratio, and means for sending the determined CSI to a serving eNB. The aforementioned means may be one or more of the aforementioned modules of the apparatus 1102 and/or the processing system 1214 of the apparatus 1102' configured to perform the functions recited by the aforementioned means. As described supra, the processing system 1214 may include the TX Processor 668, the RX Processor 656, and the controller/processor 659. As such, in one configuration, the aforementioned means may be the TX Processor 668, the RX Processor 656, and the controller/processor 659 configured to perform the functions recited by the aforementioned means.

It is understood that the specific order or hierarchy of steps in the processes/flow charts disclosed is an illustration of exemplary approaches. Based upon design preferences, it is understood that the specific order or hierarchy of steps in the processes/flow charts may be rearranged. Further, some steps may be combined or omitted. The accompanying method claims present elements of the various steps in a sample order, and are not meant to be limited to the specific order or hierarchy presented.

The previous description is provided to enable any person skilled in the art to practice the various aspects described herein. Various modifications to these aspects will be readily apparent to those skilled in the art, and the generic principles defined herein may be applied to other aspects. Thus, the claims are not intended to be limited to the aspects shown herein, but is to be accorded the full scope consistent with the language claims, wherein reference to an element in the singular is not intended to mean "one and only one" unless specifically so stated, but rather "one or more." The word "exemplary" is used herein to mean "serving as an example, instance, or illustration." Any aspect described herein as "exemplary" is not necessarily to be construed as preferred or advantageous over other aspects." Unless specifically stated otherwise, the term "some" refers to one or more. Combinations such as "at least one of A, B, or C," "at least one of A, B, and C," and "A, B, C, or any combination thereof" include any combination of A, B, and/or C, and may include multiples of A, multiples of B, or multiples of C. Specifically, combinations such as "at least one of A, B, or C," "at least one of A, B, and C," and "A, B, C, or any combination thereof" may be A only, B only, C only, A and B, A and C, B and C, or A and B and C, where any such combinations may contain one or more member or members of A, B, or C. All structural and functional equivalents to the elements of the various aspects described throughout this disclosure that are known or later come to be known to those of ordinary skill in the art are expressly incorporated herein by reference and are intended to be encompassed by the claims. Moreover, nothing disclosed herein is intended to be dedicated to the public regardless of whether such disclosure is explicitly recited in the claims. No claim element is to be construed as a means plus function unless the element is expressly recited using the phrase "means for."

What is claimed is:

1. A method of wireless communication at a User Equipment (UE), comprising:
    identifying properties associated with reference signals of a received payload of a downlink transmission by determining at least one of a number of resource elements carrying reference signals within the received payload, locations of resource elements carrying the reference signals within the received payload, a sequence received in the reference signals within the received payload, or a number of bundled resource block pairs with a same precoding within the received payload, wherein the reference signals facilitate channel estimation and are within the received payload;
    determining a payload structure including a coding rate associated with the payload based on the identified properties associated with the reference signals of the received payload; and
    decoding the received payload based on the determined payload structure.

2. The method of claim 1, further comprising receiving, at the UE, mapping information indicating a mapping between properties associated with reference signals and payload structures, wherein the payload structure is determined further based on the received mapping information.

3. The method of claim 2, wherein the mapping information is received through one of a broadcast or radio resource control (RRC) signaling, and wherein the reference signals within the received payload include UE-specific reference signals.

4. The method of claim 1, wherein determining the payload structure further includes determining at least one of:
    a modulation order associated with the payload,
    an indication regarding whether the payload includes data or control information,
    a type of control channel carrying the payload,
    a type of data channel carrying the payload,
    an indication regarding whether the payload is convolutional coded or turbo coded,
    a traffic to pilot ratio of the payload,
    a transmission rank of the payload,
    a number of codewords in the payload,
    an indication regarding whether the payload is unicast or multicast,
    a number of transmission antenna ports used for transmitting the payload,
    a scrambling sequence used for data in the payload,
    a scrambling sequence used for a cyclic redundancy check (CRC) field in the payload, or
    a combination thereof.

5. The method of claim 1, wherein the identifying the properties associated with reference signals of the received payload comprises determining the number of resource elements carrying reference signals within the payload, and
    wherein the determining the payload structure comprises determining at least one of a modulation order or the coding rate associated with the payload based on the determined number of the resource elements carrying the reference signals within the payload.

6. The method of claim 5, wherein the reference signals are received in a first set of resource elements known to carry reference signals and a second set of resource elements known to carry data.

7. The method of claim 5, wherein the determining the payload structure further comprises determining a transmission rank associated with the payload based on the determined number of the resource elements carrying the reference signals within the payload.

8. The method of claim 1, wherein the identifying the properties associated with the reference signals of the received payload further comprises determining a traffic to pilot ratio of the payload, and
wherein the determining the payload structure comprises further determining at least one of
a modulation order,
a number of codewords,
a transmission rank associated with the payload based on the determined traffic to pilot ratio, or
a combination thereof.

9. The method of claim 1, wherein the identifying the properties associated with the reference signals of the received payload comprises determining the number of bundled resource block pairs with a same precoding, and
wherein the determining the payload structure comprises determining at least one of a modulation order or the coding rate based on the determined number of bundled resource block pairs with the same precoding.

10. The method of claim 1, wherein the determining the payload structure comprises determining a modulation order, and the method further comprises:
determining a traffic to pilot ratio based on the determined modulation order;
determining channel state information based on the determined traffic to pilot ratio; and
sending the determined channel state information to a serving evolved Node B (eNB).

11. The method of claim 1, wherein identifying properties associated with the reference signals of the received payload of a downlink transmission further includes identifying a traffic to pilot ratio of the payload, wherein the traffic to pilot ratio of the payload is identified from a plurality of different traffic to pilot ratios.

12. An apparatus for wireless communication, comprising:
means for identifying properties associated with reference signals of a received payload of a downlink transmission by determining at least one of a number of resource elements carrying reference signals within the received payload, locations of resource elements carrying the reference signals within the received payload, a sequence received in the reference signals within the received payload, or a number of bundled resource block pairs with a same precoding within the received payload, wherein the reference signals facilitate channel estimation and are within the received payload;
means for determining a payload structure including a coding rate associated with the payload based on the identified properties associated with the reference signals of the received payload; and
means for decoding the received payload based on the determined payload structure.

13. The apparatus of claim 12, further comprising means for receiving mapping information indicating a mapping between properties associated with reference signals and payload structures, wherein the payload structure is determined further based on the received mapping information.

14. The apparatus of claim 13, wherein the mapping information is received through one of a broadcast or radio resource control (RRC) signaling.

15. The apparatus of claim 12, wherein determining the payload structure further includes determining at least one of
a modulation order associated with the payload,
an indication regarding whether the payload includes data or control information,
a type of control channel carrying the payload,
a type of data channel carrying the payload,
an indication regarding whether the payload is convolutional coded or turbo coded,
a traffic to pilot ratio of the payload,
a transmission rank of the payload,
a number of codewords in the payload,
an indication regarding whether the payload is unicast or multicast,
a number of transmission antenna ports used for transmitting the payload,
a scrambling sequence used for data in the payload,
a scrambling sequence used for a cyclic redundancy check (CRC) field in the payload, or
a combination thereof.

16. The apparatus of claim 12, wherein the means for identifying the properties associated with the reference signals of the received payload is configured to determine the number of resource elements carrying reference signals within the payload, and
wherein the means for determining the payload structure is configured to determine at least one of a modulation order or the coding rate associated with the payload based on the determined number of the resource elements carrying the reference signals within the payload.

17. The apparatus of claim 16, wherein the reference signals are received in a first set of resource elements known to carry reference signals and a second set of resource elements known to carry data.

18. The apparatus of claim 16, wherein the means for determining the payload structure is configured to determine a transmission rank associated with the payload based on the determined number of the resource elements carrying the reference signals within the payload.

19. The apparatus of claim 12, wherein the means for identifying the properties associated with the reference signals of the received payload is further configured to determine a traffic to pilot ratio of the payload, and
wherein the means for determining the payload structure is further configured to determine at least one of
a modulation order,
a number of codewords,
a transmission rank associated with the payload based on the determined traffic to pilot ratio, or
a combination thereof.

20. The apparatus of claim 12, wherein the means for identifying the properties associated with the reference signals of the received payload is configured to determine the number of bundled resource block pairs with a same precoding, and
wherein the means for determining the payload structure is configured to determine at least one of a modulation order or the coding rate based on the determined number of bundled resource block pairs with the same precoding.

21. The apparatus of claim 12, wherein the means for determining the payload structure is configured to determine a modulation order, and the apparatus further comprises:
means for determining a traffic to pilot ratio based on the determined modulation order;
means for determining channel state information based on the determined traffic to pilot ratio; and
means for sending the determined channel state information to a serving evolved Node B (eNB).

22. The apparatus of claim 12, wherein identifying properties associated with the reference signals of the received payload of a downlink transmission further includes identifying a traffic to pilot ratio of the payload, wherein the traffic to pilot ratio of the payload is identified from a plurality of different traffic to pilot ratios.

23. An apparatus of wireless communication, comprising:
a memory; and
at least one processor coupled to the memory and configured to:
identify properties associated with reference signals of a received payload of a downlink transmission by determining at least one of a number of resource elements carrying reference signals within the received payload, locations of resource elements carrying the reference signals within the received payload, a sequence received in the reference signals within the received payload, or a number of bundled resource block pairs with a same precoding within the received payload, wherein the reference signals facilitate channel estimation and are within the received payload;
determine a payload structure including a coding rate associated with the payload based on the identified properties associated with the reference signals of the received payload; and
decode the received payload based on the determined payload structure.

24. The apparatus of claim 23, wherein the at least one processor is further configured to receive mapping information indicating a mapping between properties associated with reference signals and payload structures, wherein the payload structure is determined further based on the received mapping information.

25. The apparatus of claim 23, wherein determining the payload structure further includes determining at least one of:
a modulation order associated with the payload,
an indication regarding whether the payload includes data or control information,
a type of control channel carrying the payload,
a type of data channel carrying the payload,
an indication regarding whether the payload is convolutional coded or turbo coded,
a traffic to pilot ratio of the payload,
a transmission rank of the payload,
a number of codewords in the payload,
an indication regarding whether the payload is unicast or multicast,
a number of transmission antenna ports used for transmitting the payload,
a scrambling sequence used for data in the payload,
a scrambling sequence used for a cyclic redundancy check (CRC) field in the payload, or
a combination thereof.

26. The apparatus of claim 23, wherein the at least one processor is configured to identify the properties associated with the reference signals of the received payload by determining the number of resource elements carrying reference signals within the payload, and
wherein the at least one processor is configured to determine the payload structure by determining at least one of a modulation order or the coding rate associated with the payload based on the determined number of the resource elements carrying the reference signals within the payload.

27. The apparatus of claim 23, wherein the at least one processor is further configured to determine a traffic to pilot ratio of the payload, as part of being configured to identify the properties associated with the reference signals, and
wherein the at least one processor is configured to determine the payload structure by further determining at least one of
a modulation order,
a number of codewords,
a transmission rank associated with the payload based on the determined traffic to pilot ratio,
or a combination thereof.

28. The apparatus of claim 23, wherein the at least one processor is configured to identify the properties associated with the reference signals of the received payload by determining the number of bundled resource block pairs with a same precoding, and
wherein the at least one processor is configured to determine the payload structure by determining at least one of a modulation order or the coding rate based on the determined number of bundled resource block pairs with the same precoding.

29. The apparatus of claim 23, wherein said processor is further configured, as part of being configured to identify properties associated with the reference signals of the received payload of a downlink transmission, to identify a traffic to pilot ratio of the payload, wherein the traffic to pilot ratio of the payload is identified from a plurality of different traffic to pilot ratios.

30. A non-transitory computer-readable medium storing computer executable code, comprising code to:
identify properties associated with reference signals of a received payload of a downlink transmission by determining at least one of a number of resource elements carrying reference signals within the received payload, locations of resource elements carrying the reference signals within the received payload, a sequence received in the reference signals within the received payload, or a number of bundled resource block pairs with a same precoding within the received payload, wherein the reference signals facilitate channel estimation and are within the received payload;
determine a payload structure including a coding rate associated with the payload based on the identified properties associated with the reference signals of the received payload; and
decode the received payload based on the determined payload structure.

31. The non-transitory computer-readable medium of claim 30, wherein said code to identify properties associated with the reference signals of the received payload of a downlink transmission further includes code to identify a traffic to pilot ratio of the payload, wherein the traffic to pilot ratio of the payload is identified from a plurality of different traffic to pilot ratios.

* * * * *